United States Patent
Hania et al.

(10) Patent No.: US 11,021,177 B2
(45) Date of Patent: Jun. 1, 2021

(54) SYSTEM AND METHOD FOR OBJECT AND OBSTACLE DETECTION AND CLASSIFICATION IN COLLISION AVOIDANCE OF RAILWAY APPLICATIONS

(71) Applicant: RAIL VISION LTD, Ra'anana (IL)

(72) Inventors: Shahar Hania, Kedumim (IL); Avraham Ram Guissin, Beit Yanai (IL); Sharon Bason, Rosh Haayin (IL)

(73) Assignee: RAIL VISION LTD, Ra'anana (IL)

( * ) Notice: Subject to any disclaimer, the term of this patent is extended or adjusted under 35 U.S.C. 154(b) by 0 days.

(21) Appl. No.: 16/342,277

(22) PCT Filed: Oct. 19, 2017

(86) PCT No.: PCT/IB2017/056498
§ 371 (c)(1),
(2) Date: Apr. 16, 2019

(87) PCT Pub. No.: WO2018/073778
PCT Pub. Date: Apr. 26, 2018

(65) Prior Publication Data
US 2020/0307661 A1    Oct. 1, 2020

Related U.S. Application Data

(60) Provisional application No. 62/410,403, filed on Oct. 20, 2016.

(51) Int. Cl.
*B61L 23/04* (2006.01)
*G06T 7/181* (2017.01)
(Continued)

(52) U.S. Cl.
CPC .......... *B61L 23/041* (2013.01); *B61L 25/025* (2013.01); *G06K 9/00805* (2013.01);
(Continued)

(58) Field of Classification Search
CPC ... B61L 23/041; B61L 25/025; G06K 9/2018; G06K 9/00805; G06K 9/6288;
(Continued)

(56) References Cited

U.S. PATENT DOCUMENTS 5,429,329 A * 7/1995 Wallace ................ B61L 23/041
246/121
5,987,979 A * 11/1999 Bryan ...................... B61K 9/08
33/1 Q (Continued)

FOREIGN PATENT DOCUMENTS

CA    2 850 395    4/2013
CN    2662384 Y    12/2004
(Continued)

OTHER PUBLICATIONS

International Search Report of Application No. PCT/IB2017/056498 dated Mar. 1, 2018.
(Continued)

*Primary Examiner* — John B Strege
(74) *Attorney, Agent, or Firm* — Pearl Cohen Zedek Latzer Baratz LLP

(57) ABSTRACT

A system for detection and identification of objects and obstacles near, between or on railway comprise several forward-looking imagers adapted to cover each different range forward and preferably to be sensitive each to different wavelength of radiation, including visible light, LWIR, and SWIR. The substantially homogeneous temperature along the rail the image of which is included in an imager frame assists in identifying and distinguishing the rail from the background. Image processing is applied to define living creature in the image frame and to distinguish from a man-made object based on temperature of the body. Electro optic sensors (e.g. thermal infrared imaging sensor and (Continued)

visible band imaging sensor) are used to survey and monitor railway scenes in real time.

14 Claims, 30 Drawing Sheets

(51) Int. Cl.
    *B61L 25/02* (2006.01)
    *G06K 9/00* (2006.01)
    *G06K 9/20* (2006.01)
    *G06K 9/62* (2006.01)
(52) U.S. Cl.
    CPC ............ *G06K 9/2018* (2013.01); *G06T 7/181* (2017.01); *G06K 9/6288* (2013.01); *G06T 2207/10016* (2013.01); *G06T 2207/10048* (2013.01); *G06T 2207/20032* (2013.01); *G06T 2207/20044* (2013.01); *G06T 2207/30256* (2013.01)
(58) Field of Classification Search
    CPC ........... G06T 7/181; G06T 2207/30256; G06T 2207/10048; G06T 2207/10016; G06T 2207/20032; G06T 2207/20044
    See application file for complete search history.

(56) References Cited

U.S. PATENT DOCUMENTS

| | | | | |
|---|---|---|---|---|
| 6,163,755 A * | 12/2000 | Peer | ...................... | B61L 23/041 701/301 |
| 6,570,497 B2 * | 5/2003 | Puckette, IV | ............ | B61K 9/08 340/301 |
| 8,605,947 B2 | 12/2013 | Zhang et al. | | |
| 8,942,426 B2 * | 1/2015 | Bar-Am | ................... | B61K 9/08 382/104 |
| 9,875,414 B2 * | 1/2018 | Naithani | ............... | G06T 7/0008 |
| 10,110,795 B2 * | 10/2018 | Kraeling | ............ | H04N 5/23206 |
| 10,308,265 B2 * | 6/2019 | Fahmy | ................ | B61L 27/0094 |
| 10,569,792 B2 * | 2/2020 | Fahmy | .................. | B61L 23/044 |
| 10,618,537 B2 * | 4/2020 | Khosla | ................ | B61L 15/0027 |
| 2004/0056182 A1 * | 3/2004 | Jamieson | ................ | B61L 23/34 250/221 |
| 2004/0071367 A1 * | 4/2004 | Irani | ........................ | G06T 7/20 382/284 |
| 2004/0073366 A1 * | 4/2004 | Jones | .................... | B61L 23/041 701/301 |
| 2006/0098843 A1 * | 5/2006 | Chew | .................... | B61L 23/041 382/103 |
| 2010/0104199 A1 | 4/2010 | Zhang et al. | | |
| 2012/0026328 A1 | 2/2012 | Sethna et al. | | |
| 2015/0269722 A1 * | 9/2015 | Naithani | ............... | G06T 7/0004 382/104 |
| 2016/0152253 A1 | 6/2016 | Katz et al. | | |
| 2019/0176862 A1 * | 6/2019 | Kumar | ............... | G06K 9/00651 |

FOREIGN PATENT DOCUMENTS

| | | |
|---|---|---|
| CN | 1632613 A | 6/2005 |
| CN | 101670578 A | 3/2010 |
| CN | 101966846 | 2/2011 |
| CN | 104331910 A | 2/2015 |
| CN | 105398471 | 3/2016 |
| CN | 105701844 | 6/2016 |
| EP | 2993105 | 3/2016 |
| WO | WO 2005/120924 | 12/2006 |

OTHER PUBLICATIONS

Kruse f et al. "Multisensorsystem Fur schienengebundene Fahrzeuge", Symposium Mobilitaet and sicherheit, Sep. 2001, pp. 1-8 ,xp002264503.
European search report for application No. EP17862602.4 dated Oct. 1, 2020.
Office action for Chinese application No. 2017800760586 dated Nov. 27, 2020.

* cited by examiner

408

410

412

402

404

406

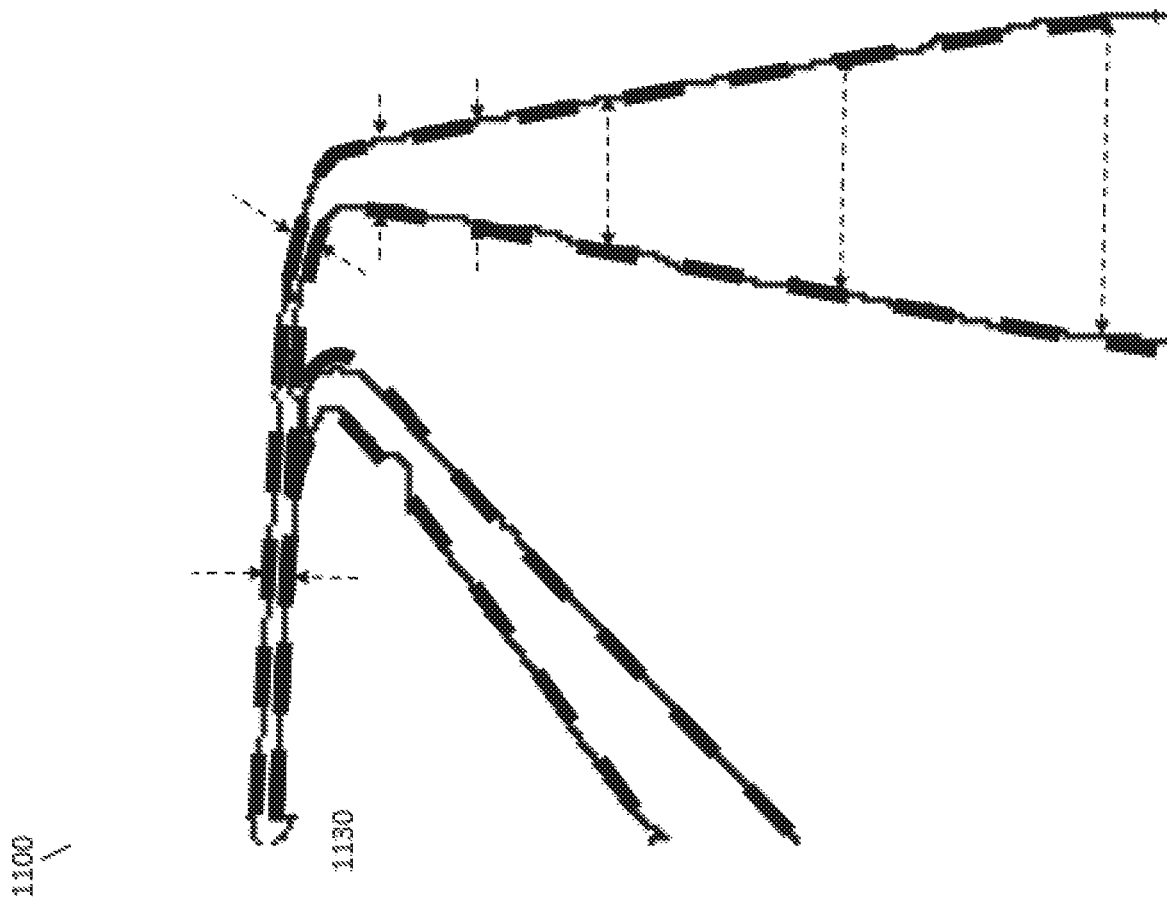
Fig. 21 (Cont. 1)

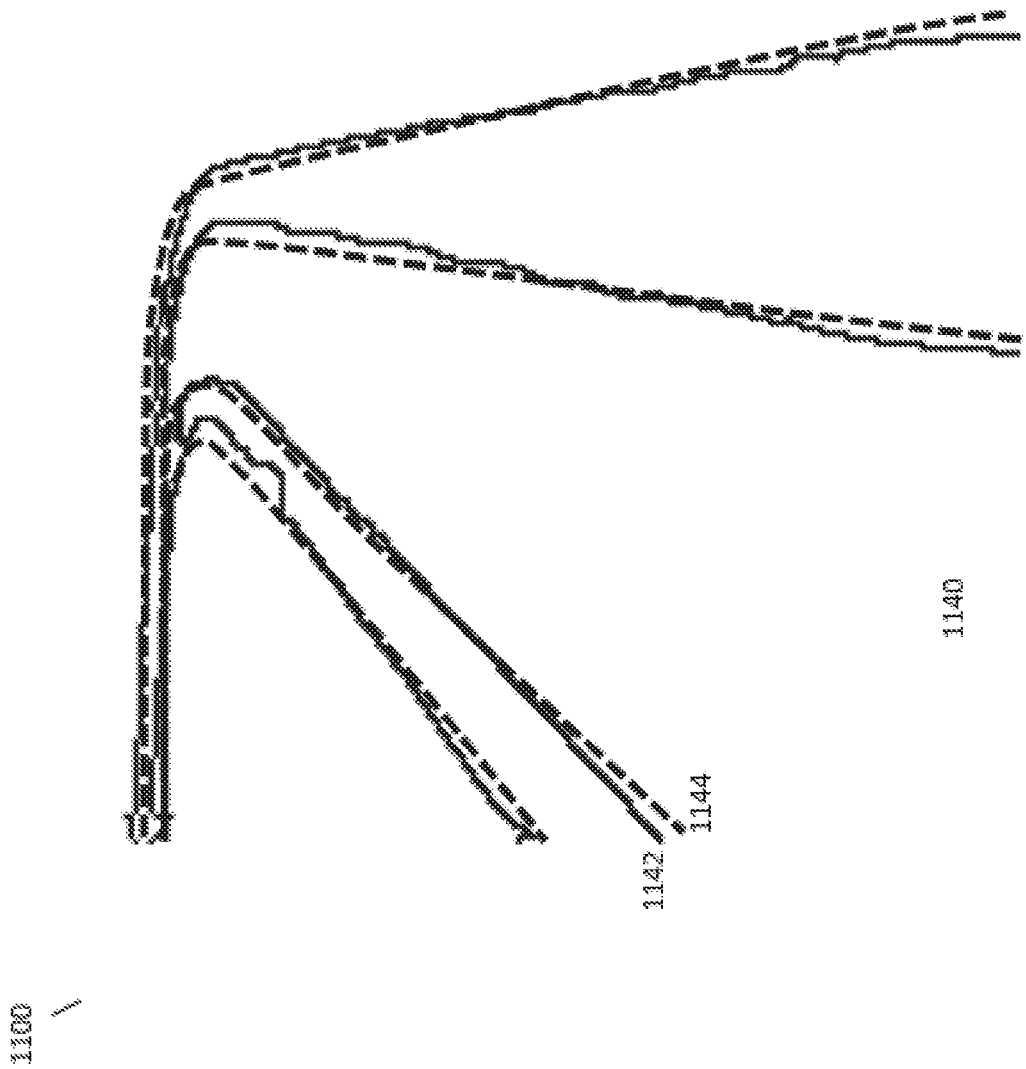
Fig. 21 (Cont. 2)

SYSTEM AND METHOD FOR OBJECT AND OBSTACLE DETECTION AND CLASSIFICATION IN COLLISION AVOIDANCE OF RAILWAY APPLICATIONS

CROSS-REFERENCE TO RELATED APPLICATIONS

This application is a National Phase Application of PCT International Application No. PCT/IB2017/056498, International Filing Date Oct. 19, 2017, entitled "System and Method for Object and Obstacle Detection and Classification in Collision Avoidance of Railway Applications", published on Apr. 26, 2018 as International Patent Application Publication No. WO 2018/073778, claiming the benefit of U.S. Provisional Patent Application No. 62/410,403, filed Oct. 20, 2016, which is incorporated herein by reference in its entirety.

FIELD OF THE INVENTION

This invention generally relates to computer aided imaging techniques for automatic or semi-automatic object and obstacle detection and classification in collision avoidance of railway applications.

BACKGROUND OF THE INVENTION

In typical Electro-Optic (EO) computer aided imaging techniques, an image of a region or scene is produced and processed in order to analyze it and extract desired data therefrom.

In railway safety and collision avoidance applications, for example, various EO sensors are used to survey and monitor railway scenes, including (a) wayside sensors and (b) train-mounted (e.g. locomotive) sensors. Such train-mounted forward looking sensors may be used to survey railway scenes in real time, thereby detecting and classifying stationary or moving objects and obstacles on or in the vicinity of the rails. Such detection, classification and alarm may be used in driver-operated trains as well as in autonomous trains.

Such detection of objects and obstacles may include, for example, humans, animals, vehicles and various man-made objects as well as natural debris (e.g. fallen trees).

Such EO day and night image-based detection and classification of objects and obstacles in railway scenes is challenging due to the extended ranges and diverse weather conditions required for such sensing and image analysis in timely responding to such potential collisions (e.g. generating alarms, reducing the speed of the train, stopping the train in time).

SUMMARY OF THE INVENTION

A method for rail obstacle detection and avoidance is disclosed comprising performing rail detection and tracking process, performing object and obstacle detection, performing object and obstacle classification, and providing by a display, user-interface and alarm module (DUAM) display, user interface and alarm signals. The rail detection and tracking process comprising spatial rail detection, temporal rail tracking, and image based rail mapping. The object and obstacle detection comprising spatial object and obstacle detection and temporal object and obstacle tracking. The object and obstacle classification comprising object and obstacle silhouette analyzing and object and obstacle classification.

In some embodiments the method further comprising, in the rail detection and tracking process stage, performing rail-based ranging.

In some embodiments the method further comprising, in the rail detection and tracking process stage, receiving geo-location information, performing 3D modeling of the area close to the rail and performing geo-based rail mapping.

In some embodiments the method further comprising performing object and obstacle analysis using neural net computing.

In some embodiments the method further comprising providing geo-location and 3D modeling of the area close to the rail to the DUAM.

In yet further embodiments the method further comprising determining a forward range for setting a separation line for separating the field of view of the rails to a first segment associated with a short range imager and a second segment extending beyond the first segment and associated with a long range imager.

According to additional embodiments the method further comprising obtaining images of a rails in front of a traveling vehicle from two or more imagers, wherein at least one of the two or more imagers is adapted to obtain images in a range of wavelengths different form that of at least one other imager.

In yet additional embodiments the method further comprising obtaining images of a rails in front of a traveling vehicle from two or more imagers, wherein at least one of the two or more imagers is adapted to have field of view narrower than that of at least one other imager.

According to additional embodiments the rail-based ranging comprises calculation of the range along the rails based on known gauge of the rail.

A system for rail obstacle detection and avoidance is disclosed comprising at least two imagers aimed to the direction of travel along the rail, a controller to receive plurality of images from the at least two imagers, to process the images, to identify and detect rail in the images, to identify and detect objects posing threat thus being potential obstacle in the vicinity of the rail and to provide alarm signal when threatening object is detected, a driver monitor to present to a train driver images received from the at least two imagers and to present processed rail and objects detected in the images and alarming unit to provide alarms when obstacle is detected. The at least two imagers are of different sensing range from each other.

According to additional embodiment the system further comprising storage unit to store images received from the at least two imagers, to store processed images, to store programs that when executed by the controller perform obstacle detection and avoidance.

According to additional embodiment the at least one of at least two imagers is operative in a wavelength range different from at least one other imager from the at least two imagers.

According to yet additional embodiment the system further comprising ambient and location sensing unit adapted to sense weather near the rail and to provide location indication for a train traveling on the rail.

In further embodiment the system comprising communication unit to enable communication of alarm signals and of location of the system to external units.

According to additional embodiment the detection and identification of obstacles comprises processing of images from the at least two imagers based on location-based mapping of the rails and its close ambient.

According to additional embodiment the controller is adapted to perform neural net analysis of the images from the at least two imagers.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS OF THE INVENTION

Figure 1:
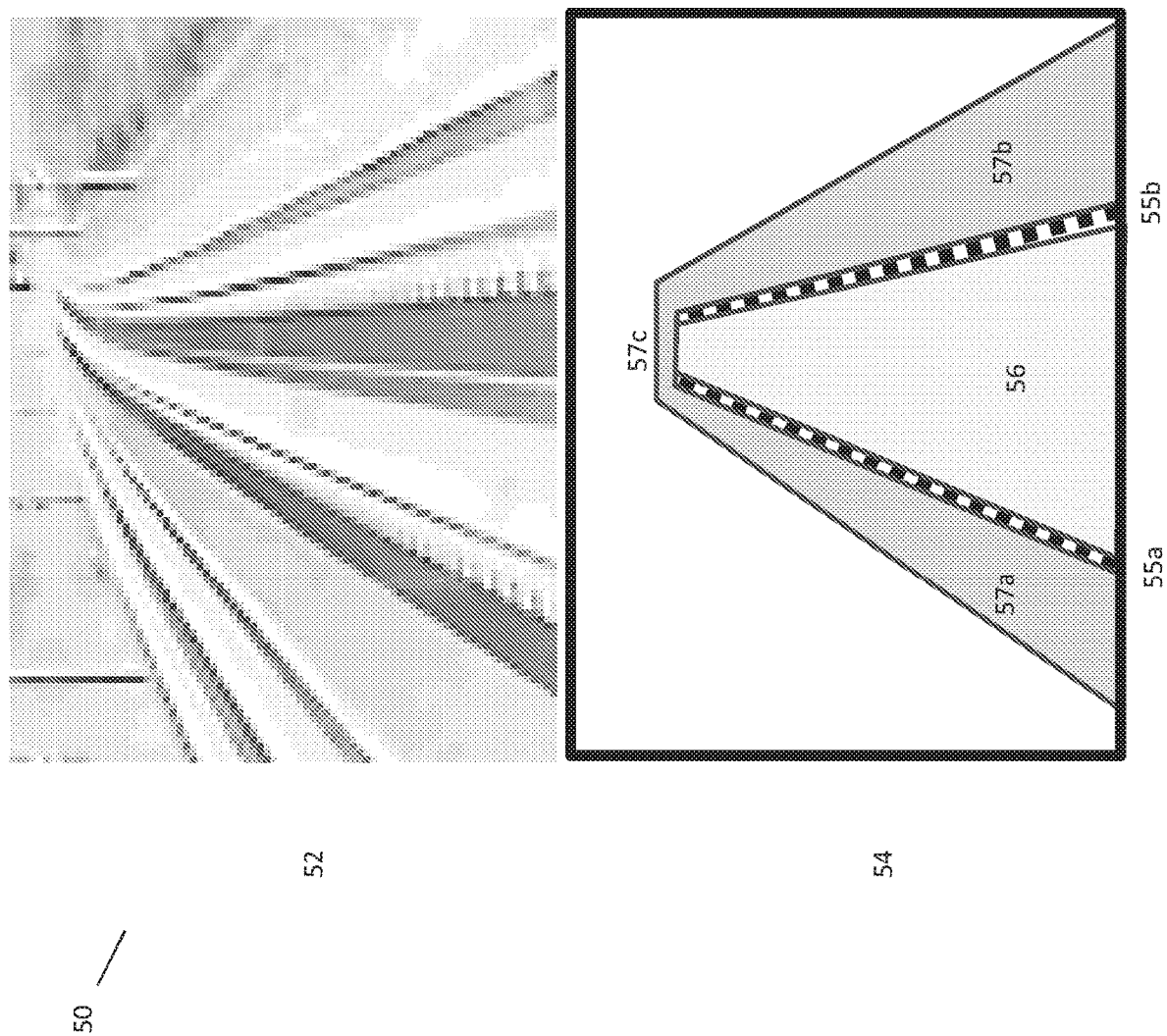
FIG. 1 illustrates a typical forward looking on board imaging railway scene, and a respective vision-processing based rail map generated in accordance with some embodiments.

The present application generally relates to a computer aided imaging and vision system and techniques useful for object and obstacle detection and classification in railway applications.

In such railway safety and obstacle/collision avoidance applications, various train-mounted (e.g. locomotive) EO sensors (e.g. thermal infrared imaging sensor and visible band imaging sensor) are used to survey and monitor railway scenes in real time, thereby detecting and classifying stationary or moving objects and obstacles on or in the vicinity of the rails. Such detection, classification and alarm may be used in driver-operated trains as well as in autonomous trains.

Such EO detection of objects and obstacles may include, for example, humans, animals, vehicles and various man-made objects as well as natural debris (e.g. fallen trees) and a variety of rail malfunctions. Such variety of adverse situations at varying day/night conditions, ranges and weather situations pose challenges to any such sensing and image analysis in timely responding to such potential collisions (e.g. generating alarms, reducing the speed of the train, stopping the train in time).

There is thus provided, according to one aspect of the current disclosure, an on-board forward looking imaging method and apparatus for a Railway Obstacle Avoidance System (ROAS) that detects and classifies objects and obstacles along railways, whereby such (a) stationary objects may be located between rails, on rails and in the vicinity of rails, as well as such (b) moving objects having paths that may result in impending collisions with the moving train.

In accordance with the novel ROAS as provided herein, there is a method and apparatus that incorporate forward looking imaging sensors, preferably but not limited to a Long Wave Infra Red (LWIR) imager and a visible band imager (VIS), and preferably combine such forward looking imagers in providing real time imagery which is analyzed in real time, whereby such analysis is based on image, processing and vision processing algorithms that generally apply four main processing functional modules, namely: (a) Rail Detect and Track Module (RDTM), (b) Object and Obstacle Detect Module (OODM), (c) Object and Obstacle Classify Module (OOCM), and (d) Display, User Interface and Alarm Module (DUAM). The first three main modules may be applied separately to the LWIR and the VIS imaging sensors, or alternatively such LWIR and VIS image/video outputs may undergo an image fusion process, in which case the three modules may be applied to the fused imagery video stream. All three modules generally feed into the DUAM, both in separate, processes as well as fused implementations as noted above. The fusion is mainly to support the decision machine rather than having a his& image for a user display Man Machine Interface (MMI).

The ROAS may preferably be augmented with geographical information that assists the ROAS in better responding to various situations. Such geographical information may be derived from a Geographical Location Module (GLM) (comprising for example a Global Positioning System device—GPS, Inertial Navigation System device—INS etc), a Geographical Information Module (GIM) and a 3D Module (3DM), all of which provide important real time data for the ROAS solution. The GLM may provide real time location (and derived speed) information which is essential for monitoring various train safety criteria. The GLM together with GIM information provide real time 3D geographical information regarding the railway layout and 3D terrain data, wayside infrastructure equipment (e.g. signaling posts, electrical equipment, rail turnouts and switches), crossings etc. These feed into the 3DM in generating camera view point of the said 3D information, utilized for utilization in a Geo Based Rail Map (GBRM) that can be combined with the Image Based Rail Map (IBRM) in providing a robust solution for a variety of typical train operation situations in achieving improved ROAS performance.

A preferred embodiment of the RDTM generally comprises a Spatial Rail Detect (SRD) function, Temporal Rail Track (TRT) function, Rail Based Ranging (RBR) function, and Image Based Rail Map (IBRM) function preferably augmented with a GBRM function. The SRD spatially detects the rails in each subsequent image, and the TRT tracks the detected rails over time as they may shift in location and orientation depending on the changing rail geometries and radii of curvatures, rail switching etc. From the tracked rails a continually updated IBRM is generated. The SRD feeds into the RBR function that determines the range from the imaging sensor to each part of the detected rail, whereby the range is determined based on the known (i.e. standard) gauge (inter-rail) distance and the imaging sensor optical resolution (pixel size and focal length).

The IBRM is of particular importance as it addresses various complex railway situations. Railways are often characterized by single rails along which trains may travel alternatively in either direction however not concurrently, or multiple rails allowing concurrent travel along two directions. Railways are also characterized by multiple crossings, turnouts and slips that allow for respective rail switching. The RDTM continually determines the railway segment that is currently visible to the respective imaging sensor, and generates the IBRM which outlines the image regions which may include potential obstacles that are to be detected by the subsequent OODM processing.

The IBRM output preferably comprises several sub-segments, including for example the Rail Sub Segment (RSS) that includes the two actual rails, the Internal Rail Segment (IRS) that includes the area between the respective rails, and the External Rail Segment (ERS). Such segmentation of the IBRM is preferable, thereby enabling different processing, detection criteria and sensitivities for each sub-segment.

The IBRM may preferably be augmented by, and/or fused with a GBRM, thereby addressing and overcoming issues such as rail occlusions in curved rail situations, 3D terrain changes where a rail may be occluded by a rapid terrain altitude drop, an upcoming rail crossing which may exhibit intermittent changes in rail contrast, wayside infrastructure etc.

A preferred embodiment of the OODM generally comprises a Spatial Object and Obstacle Detect. (SOOD) function, Temporal Object and Obstacle Track (TOOT) function, receiving the input image, and the IBRM and RBR outputs. Objects and obstacles of interest are to be preferably spatially detected in the IBRM sub-segments. Such and other objects may be stationary or moving, and in both cases due to the motion of the on-board imaging sensor all objects (stationary and non-stationary) will exhibit some motion in the image sequences generated by the imaging sensor. The RBR is used for determining the shape and dimensions of (range dependant) spatial detection filters. For different categories of objects, their image motion may be profiled based on range determination at each such image location and derived range. The RBR may be expanded to Catenary Post Based Ranging (CPBR) in case of catenary usage in electric trains or any other known dimensions of wayside equipment and infrastructure. The catenary post is usually 5.8 m height with a spacing of 50-70 meters. This ranging can be used when tracks are obstructed or occluded (e.g. due to snow or lack of clear LOS due to terrain variations).

A preferred embodiment of the OOCM generally comprises an Object and Obstacle Classify (OOC) function, that preferably receives outputs from at least an Object and Obstacle Silhouette Analysis (OOSA) and/or an Object and Obstacle Neural Net. Analysis (OONNA). Such analysis and classification is preferably performed only in localized regions where objects and obstacles have been detected and tracked by the OODM. Here too the RBR is useful in controlling some at least scaling features of the analysis and classification functions.

The DUAM generally serves to display and/or interfacing with external interfaces, all useful outputs of the processing modules, supports various user interfaces, and generates various alarms, safety and communications functions. The DUAM may also receive various inputs from the GLM, GIM and 3DM units.

Some exemplary applications of the embodiments described herein are discussed here below:

Application #1—Train-Mounted Forward Looking EO Sensing and Vision System for Driver-Operated Applications Trains may include tram, urban train, high speed train, freight train etc, and implementations based on the following principles:
 (a) Continuous day/night forward looking imaging and vision processing utilizing various imagers such as LWIR and VIS sensors, and split screen user displays,
 (b) Reduced driver workload utilizing automated video/vision processing for object and obstacle detection, tracking and classification based on some embodiments of this application.

Application #2—Train-Mounted Forward Looking EO Sensing and Vision System for Autonomous Train Applications Trains may include tram, urban train, high speed train, freight train etc, and implementations based on the following principles:
 (a) Continuous day/night forward looking imaging and vision processing utilizing various imagers such as LWIR and VIS sensors,
 (b) Interfaces to train breaking systems, tight communication links with control rooms, utilizing automated video/vision processing for object and Obstacle detection, tracking and classification based on some embodiments of this application.

Application #3—Wayside EO Sensing and Vision System for Rail Crossing, Rail Station and Rail Obstruction Applications (a) Continuous day/night stationary imaging and vision processing utilizing various imagers such as LWIR and VIS sensors or any other sensors (i.e. ladar, radar based etc.)
 (b) Interfaces to communication links to trains and control rooms, utilizing automated video/vision processing for object and obstacle detection, tracking and classification based on some embodiments of this application.

Application #4—Train-Mounted, Upward/Downward/Forward Looking EO Sensing and Vision System for Rail Infrastructure Preventive Maintenance Applications Trains may include tram, urban train, high speed train, freight train etc, and implementations based on the following principles:
 (a) Continuous day/night forward looking imaging and vision processing utilizing various imagers such as LWIR and VIS sensors
 (b) Improved preventive maintenance utilizing automated video/vision processing for object and obstacle detection, tracking and classification based on some embodiments of this application regarding tracks, catenary, electrical equipment etc.

Application #5—Train-Mounted, EO Sensing and Vision System for Rail Emergency ("Black Box") Applications Trains may include tram, urban train, high speed train, freight train etc, and implementations based on the following principles:
 (a) Continuous day/night forward looking imaging and vision processing utilizing various imagers such as LWIR and VIS sensors
 (b) Improved recording and alarm provisions including accident, collision, derailment and damage assessment utilizing object and obstacle detection, tracking and classification based on some embodiments of this application,
 (c) The smart storage is used selectively for logging true alarms and false alarms and upload them according to train position and discard it when not relevant through a FIFO mechanism.

In light of the above exemplary applications, the subject matter of the present application provides a generalized system and method enabling object and obstacle detection, tracking and classification, thereby generating respective alarms and response to diverse train and railway applications. Such a method may also be used to improve the ability of a driver to perceive such remote objects and potential obstacles in railway scenes and to accelerate the driver's perceptual process of detecting, classifying and responding to diverse operating conditions. Another improvement of such driver-only applications, whereby the work load of such driver-only operation is reduced significantly.

There is thus provided, according to possible embodiments of the present disclosure, an imaging system for surveillance and monitoring of railway applications and scenes, the system generally comprising the following: (a) an imaging arrangement comprising imaging devices (e.g. daylight video cameras—CCD, CMOS, ultra low light devices (i.e. CMOS imager with extremely low readout noise), night vision cameras—cooled or uncooled thermal imager, FLIR), (b) an image/video/vision processing unit for detecting and tracking objects and obstacles in the vicinity of railways, may comprise one or more processing units such as computers, controllers, DSPs, and software modules designed for execution by the processing units, or dedicated hardware modules (e.g., IC, ASIC, FPGA), and (e) a control and display unit comprising a user interface and display monitors (with or without touch screen interface). Accordingly, possible embodiments of the present disclosure may be implemented by software modules/programs to be executed by computerized machines, and/or hardware modules and units, or combinations thereof.

The performance of detection systems is generally defined by several main parameters: Probability of Detection (PD), Probability of Classification (PC), False Detection Rate (FDR), False Classification Rate (FCR). Due to the specific characteristics of railway applications and scenes, an additional important parameter plays a role here, the response time (RT) of the system.

Different objects pose varying challenges and decisions to a moving train. Stationary and moving humans, animals and vehicles require different decisions and reactions in a moving train. Natural effects such as mud, water, puddles, snow, leaves and foliage, as well as weather and atmospheric conditions, may pose challenges to any sensing and analysis process and respective decision making process. Rail malfunctions may include rail disconnects and missing rail segments. Wayside effects such as rail occlusions due to curving rails, and background scenes in the vicinity of rails which might generate false detections and classifications (e.g. bridges, masts etc).

Therefore, in some embodiments of the present disclosure different processing schemes (e.g., scripts or threads) are utilized concurrently in parallel for different objects of interest in order to account for such diversity of objects characteristics.

The combined performance of PD, PC, FDR, FC and RT provide flexibility to the railway detection and classification system, in terms of addressing the different objects of interest and rail conditions, while complying with performance requirements.

Following object detection and classification at required standoff ranges, on-board ROAS solutions generally approach such detected and classified objects enabling various short term and long term machine learning processes providing fine tuning of the algorithms. For example, as a short term machine learning adaptation, an object classification at a standoff range may call for reducing the speed of a train, yet such decision may be reversed or modified shortly thereafter when the same object is reclassified as the train approaches such object. A long term machine learning process may update the processing algorithm such that such erroneous decisions may be refined and tuned. Such processes may also be considered as a Built In Test (BIT) as the object is coming clearer and occupies more pixels thus providing more information although action activities at the close ranges are not necessarily relevant from an operational point of view, yet may be very important for the subsequent improvements and upgrades of the detection and classification algorithms.

Reference is made now to FIG. 1 which illustrates a typical forward looking, on board imaging railway scene 50, and a respective vision-processing based rail map 54 generated in accordance with some embodiments. View 50 depicts a typical ROAS application as provided herein using a forward looking on board imaging unit which provides railway scene view 52, and a respective vision-processing based IBRM view 54 generated and updated over time. The IBRM is of particular importance as it addresses various complex railway situations. Railways are often characterized by single rails along which trains may travel alternatively in either direction however not concurrently, or multiple rails allowing concurrent travel along two directions. Railways are also characterized by multiple crossings, turnouts and slips that allow for respective rail switching. The RDTM continually determines the railway segment that is currently visible to the respective imaging sensor, and generates the IBRM which outlines the image regions which may include potential obstacles that are to be detected by the subsequent OODM processing.

The IBRM output view 54 preferably comprises several sub-segments, including for example the Rail Sub Segment (RSS) that includes the two actual rails 55*a* (left rail) and 55*b* (right rail), the Internal Rail Segment (IRS) section 56 that includes the area between the respective rails, and the External Rail Segment (ERS) section 57, that may be further partitioned into three sub-segments, namely left external sub-segment unit 57*a*, right external sub-segment unit 57*b*, and distant sub-segment unit 57*c*. Such segmentation of the IBRM is often preferable, thereby enabling different processing, detection criteria and sensitivities for each sub-segment.

An ROAS typically requires obstacle detection and alarm at sufficiently long ranges thereby allowing a fast moving train to come to a stop or at least reduce speeds allowing additional response means for avoiding the obstacle or at least minimizing damage and allowing a driver (in driver operated trains) to respond accordingly. In imaging sensor applications, this typically calls for increased resolution optics (i.e. Narrow Field of view Sensor—NFS). While providing sufficient resolution for object and obstacle detection and classification, the narrow field of the NFS may also pose a limitation in typical curved rail situations if it is fixed with the train's frontal axis, whereby the rail section at extended ranges may fall outside the narrow field of the NFS. Moreover, railways often comprise multiple adjoining and crossing rails such that a NFS may be confused as to the respective rail of the moving train thereby limiting its ability to designate specific obstacles that relate to its rail (e.g. an oncoming train on an adjoining rail that does not pose an impending collision). An additional imaging sensor such as a Wide Field of view Sensor (WFS) with sufficient range overlap between the NFS and the WFS, may well assist in such situations whereby the WFS facilitates detects the respective rails and rail map at a shorter range thereby enabling the tracing of such rails to a distance in the WFS image thereby facilitating a smooth handover to the NFS image designating where and which are the respective rails of the train, such that the object/obstacle detection and designation may be correctly performed.

Figure 2:
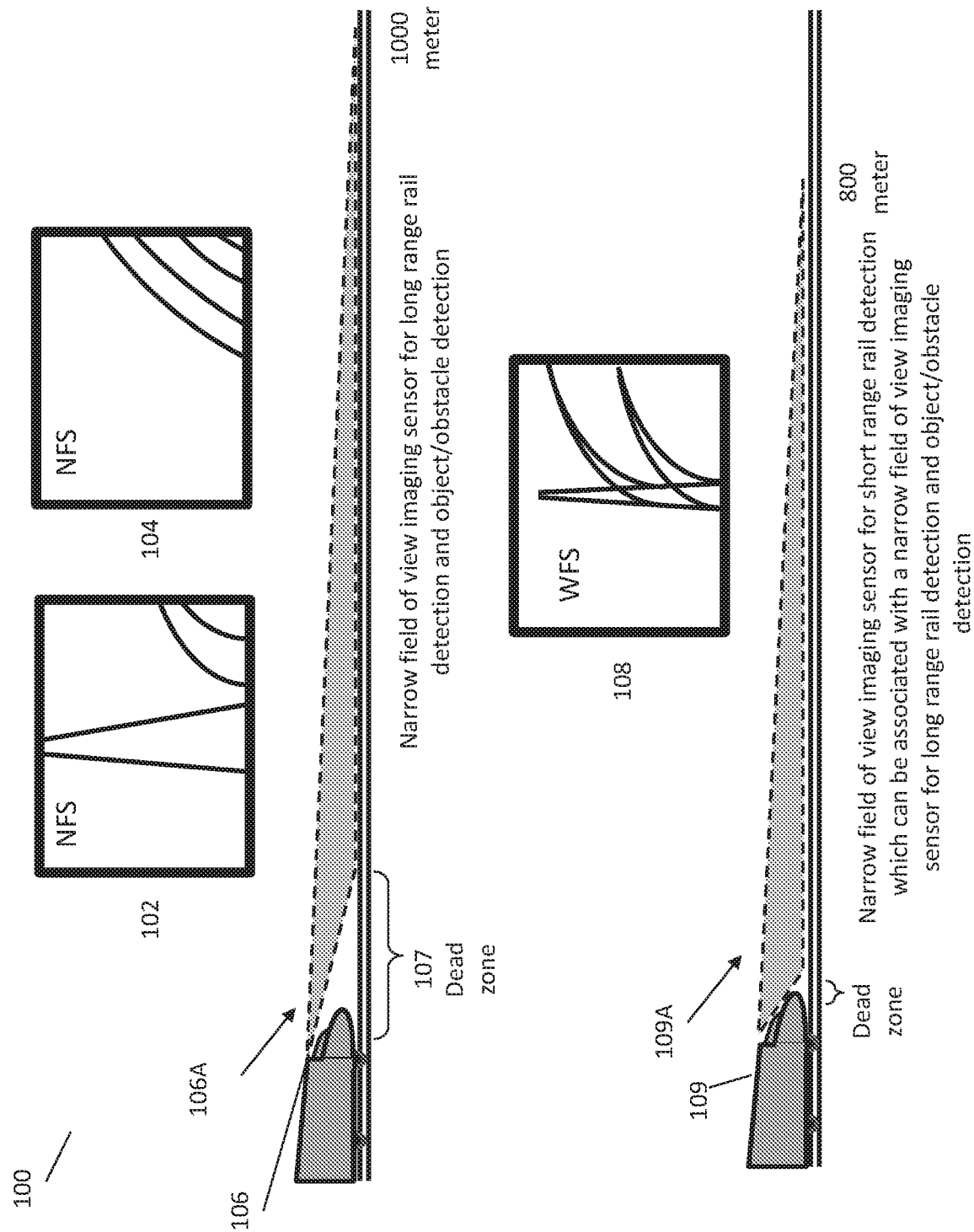
FIG. 2 illustrates a narrow field of view imaging sensor for long range rail detection and object/obstacle detection, and a wide field of view imaging sensor for short range rail detection, which can be associated with a narrow field of view imaging sensor for improved long range rail detection and object/obstacle detection, in accordance with some embodiments.

Reference is made now to FIG. 2 which illustrates a narrow field of view imaging sensor (NFS) 106 for long range rail detection and object/obstacle detection, and a wide field of view imaging sensor (WFS) 109 for short range rail detection, which can be associated with a narrow field of view imaging sensor for improved long-range rail detection and object/obstacle detection and their respective view coverage over the rails, in accordance with some embodiments. View 100 illustrates an NFS imaging situation for long range rail detection and object/obstacle detection, and a WFS imaging situation for short range rail detection, which can be associated with a narrow field of view imaging sensor for improved long-range rail detection and object/obstacle detection, in accordance with embodiments provided herein.

As noted earlier, for any forward looking ROAS solution it is vital to correctly determine which of the imaged rails is associated with the respective train. Views 102 and 104 illustrate two exemplary NFS imaging situations exhibiting ambiguity as to which rail is to be respectively associated with the discussed train. The ambiguity typically arises due to the fact that in order for the NFS to image extended ranges its Line Of Sight (LOS) must be sufficiently raised, resulting in extended dead zone 107 (e.g. typically 1.00~200 meters) as illustrated in view 106A. Within such dead zones there may occur rail curvatures and turnouts, resulting in ambiguous selection of the correct rails extending in front of the train. Such ambiguities and extended dead zones may be resolved by adding a WFS 109 as depicted in view 109A where the dead zone is considerably smaller (e.g. typically several meters). View 108 illustrates the WFS image where image analysis can detect such developing curvatures and turnouts, thereby enabling correct tracing of the rails in the WFS and associating them with the rails detected in the NFS.

Figure 3:
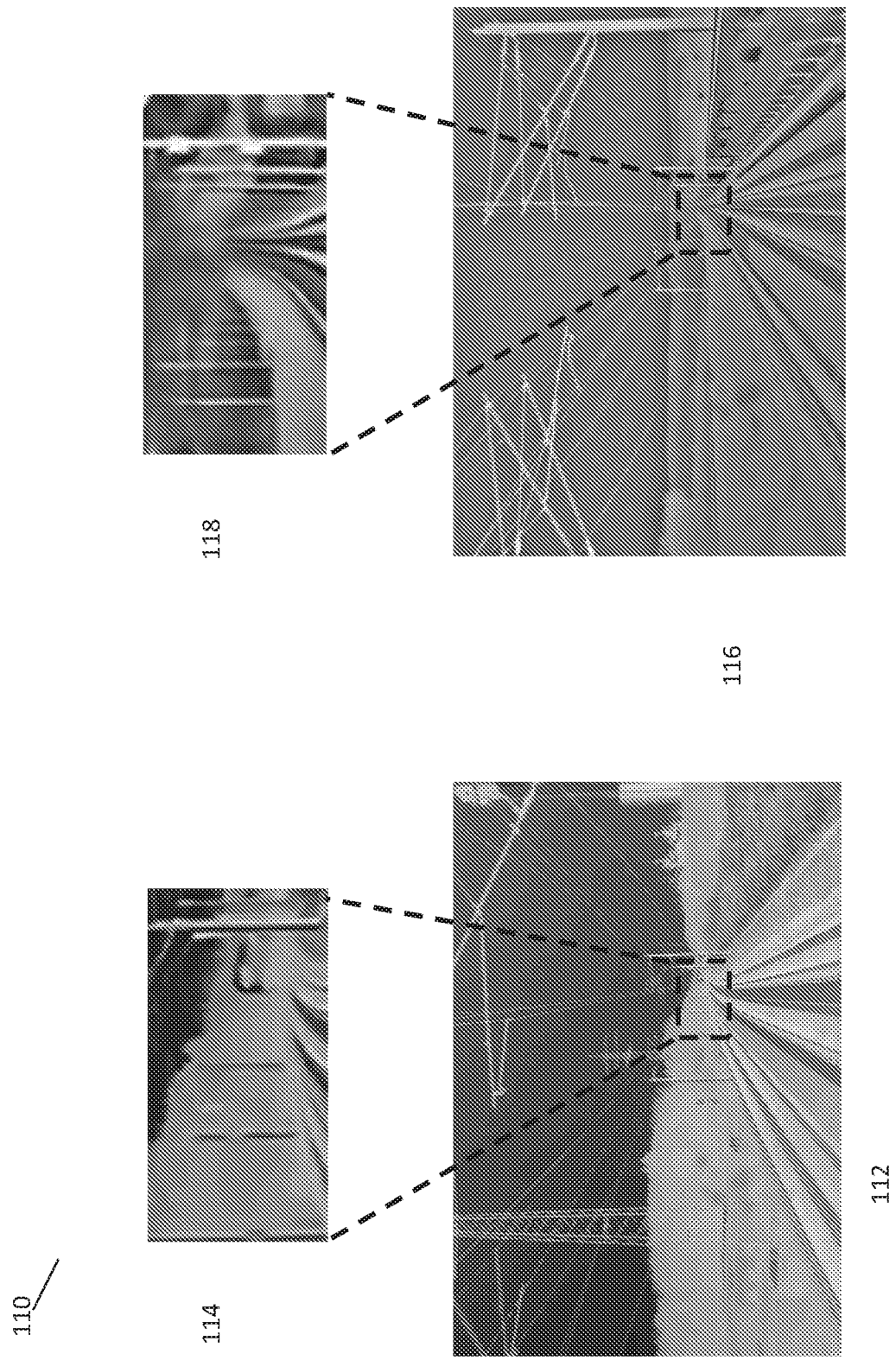
FIG. 3 illustrates two respective wide and narrow field of view scenes that depict the utility of combining wide field short range coverage analysis with the narrow field long range coverage for improved object/obstacle detection and collision avoidance, in accordance with some embodiments.

Reference is made to FIG. 3, which illustrates two respective wide and narrow field of view scenes that depict the utility of combining a WFS short range coverage analysis with a NFS long range coverage for improved object/obstacle detection and collision avoidance, in accordance with some embodiments. View 112 depicts a WFS curving rail example, and view 114 is the respective NFS scene as outlines by the broken line rectangle in view 112. Due to the image structures adjoining and between the rails, it is very difficult to select the correct rails when using only the NFS. Moreover, in the NFS an oncoming (or stationary) train is observed but it is unclear whether it uses the adjoining rails in which case it is safe or is using the same rail of the train which is an impending collision. View 116 is another WFS scene showing straight rails however the rail region is cluttered, as seen in the respective NFS view 118, imposing a difficulty in determining the correct rails for the train.

Figure 4:
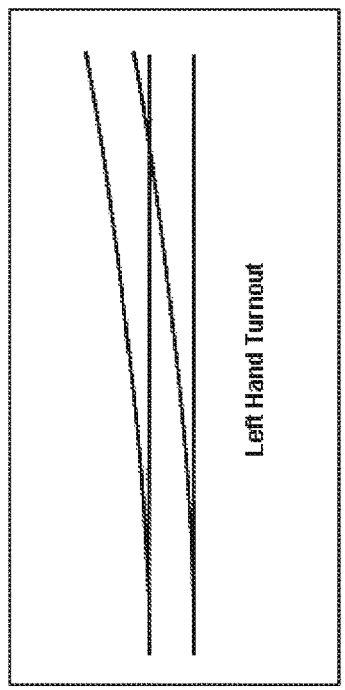
FIG. 4 depicts examples of various rail turnouts, slips and crossings, illustrating the complexity of such imaging situations when a forward looking on board imaging sensor is to automatically determine the respective rail which the train will travel on beyond such turnouts, slips and crossings, as provided in some embodiments of the present disclosure.
Figure 4:
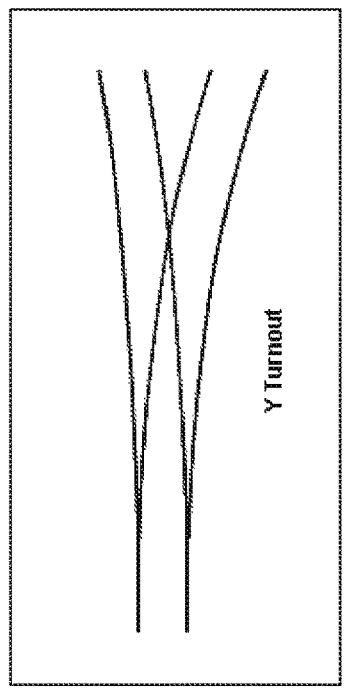
Figure 4:
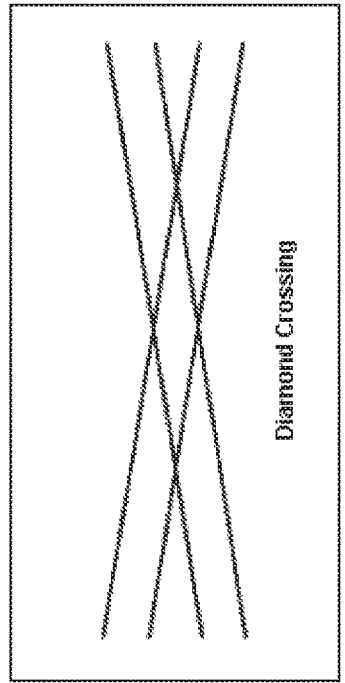
Figure 4:
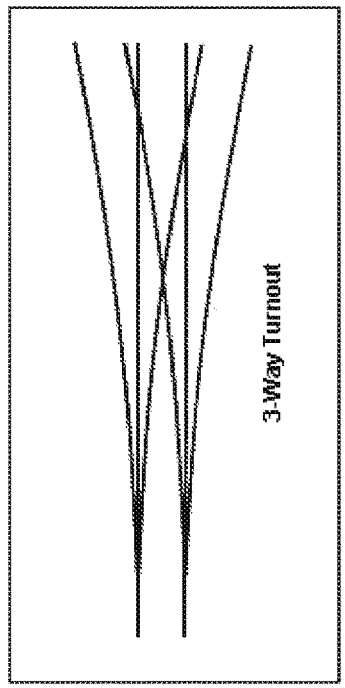
Figure 4:
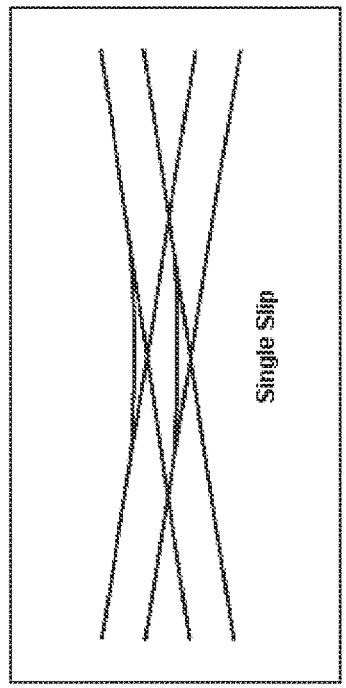
Figure 4:
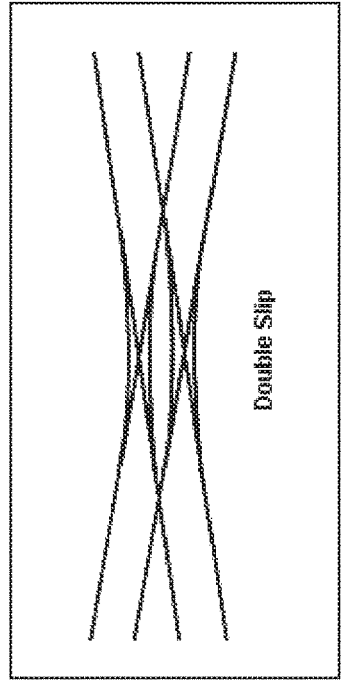

Reference is made to FIG. 4, depicting examples of various rail turnouts, slips and crossings, illustrating the complexity of such imaging situations when a forward looking on board imaging sensor is to support automatic determination of the respective rail on which the train will travel beyond such turnouts, slips and crossings, as provided in some embodiments of the present disclosure. Exemplary views 123-128 of various rail turnouts, slips and crossings, demonstrate the complexity of such imaging situations when a forward looking on board imaging sensor is to automatically determine the respective rail which the train will travel on beyond such turnouts, slips and crossings, as provided in some embodiments of the present invention. When, for example, the WFS detects such turnouts, slips and crossings, a specialized function may be activated that determines the rails that follow the immediate region next to the train and that represent the rails that continue for the forward motion of the train.

Figure 5:
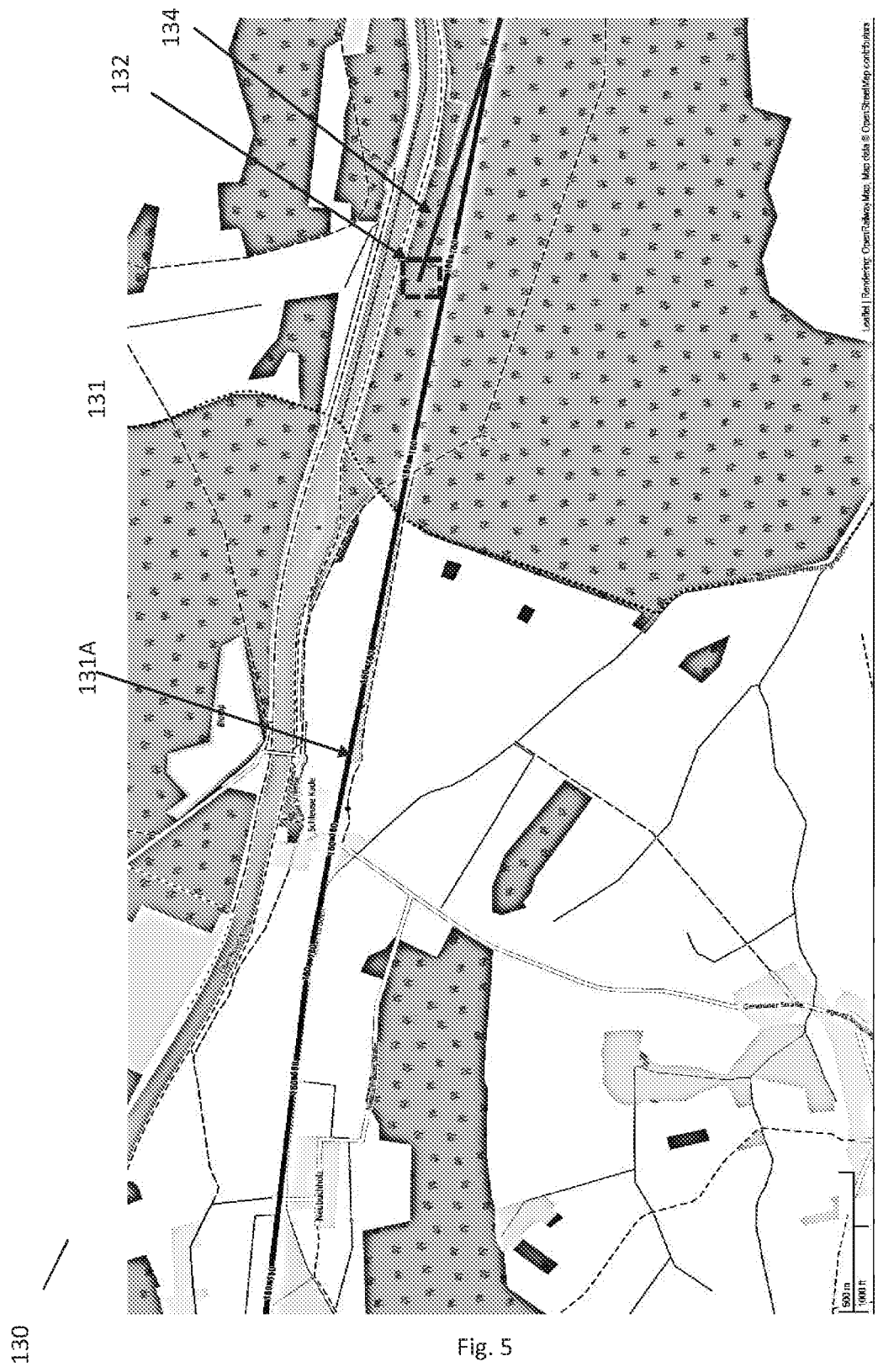
FIG. 5 is an exemplary map of a railway (green) and a respective intermittent tangent (full line) and narrow field imaging coverage (broken line) at 1 km away, depicting a situation where the rail is seen in the narrow coverage field at a slight rail turn (very large radius of curvature), as may typically occur in accordance with the currently described embodiments.
Figure 6:
FIG. 6 is an exemplary map of a railway (green) and respective intermittent tangents (full line) and narrow field imaging coverages (broken line) at 1 km away, depicting a situation where the rail is not seen in the narrow coverage field at increased rail turns (small radii of curvature), as may typically occur in accordance with the currently described embodiments.

Reference is made to FIG. 5, which illustrates an exemplary map Unit 131 of a railway 131A, a respective intermittent tangent line 134 and narrow field imaging coverage area 132 at 1 km away along line 134, depicting a situation where the rail is seen almost out of the narrow coverage field of view at a slight rail turn (very large radius of curvature), as may typically occur in accordance with the currently described embodiments. FIG. 6, to which reference is now made, depicts an exemplary map view 133 of a railway 133A and several respective intermittent tangents lines 134A, 136A and 138A and respective narrow field imaging coverages views 134, 136, 138 at 1 km away, depicting situations where the rail is not seen in the narrow coverage field at increased rail turn rates (small radii of curvature), as may typically occur in accordance with the currently described embodiments. Another important utility of the combined WFS and NFS solution, is that the WFS, by enabling detection and tracking of the rails and generating updated IBRMs, it designated to the NFS due to the overlap regions where the respective rails are to be located, in addition to avoiding false rail detections by the NFS analytics when the rails are determined by the WFS to be geometrically displaced from the NFS coverage.

Figure 7:
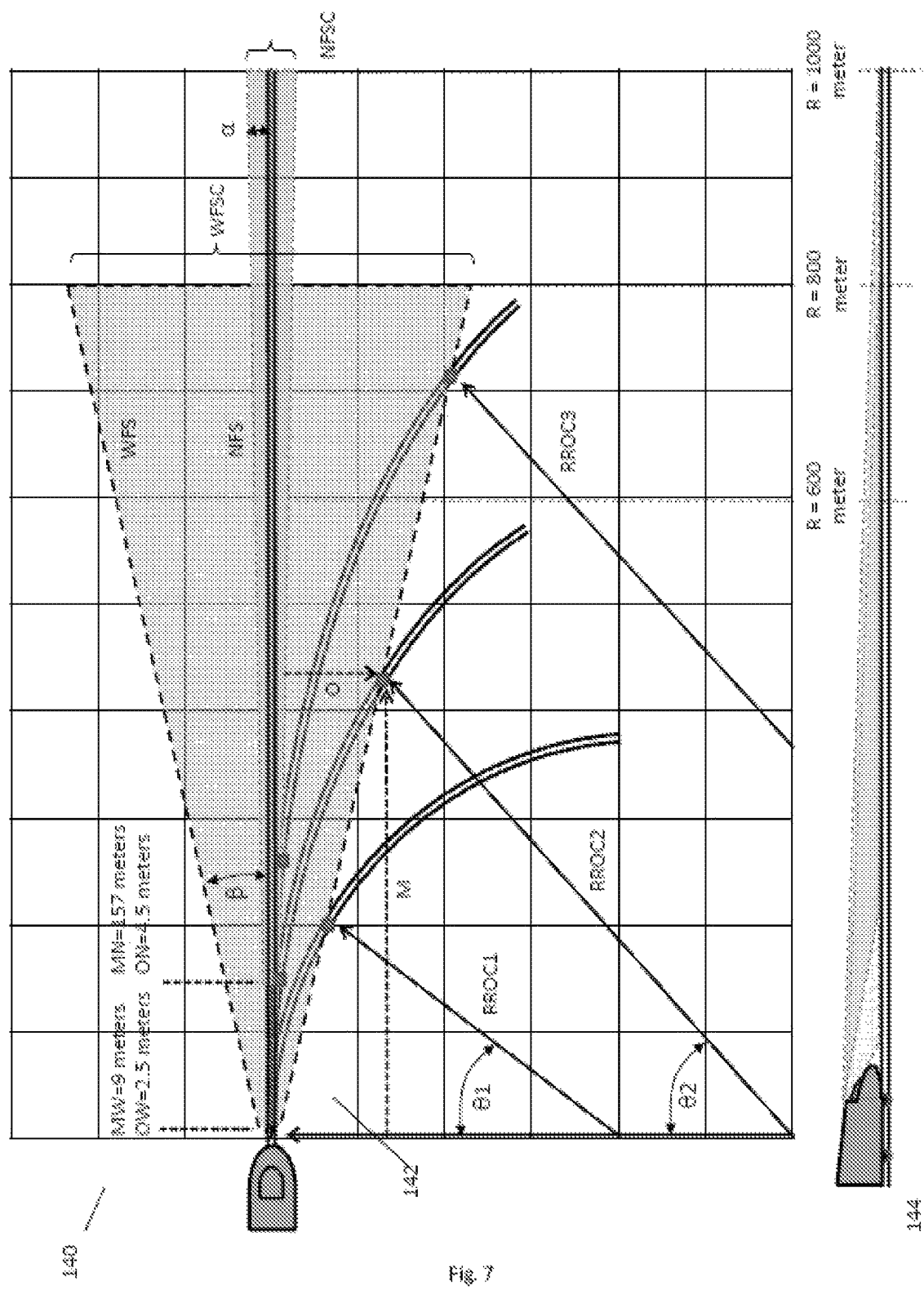
FIG. 7 is an exemplary depiction of combined coverage of wide and narrow field of view imaging sensors, that facilitate improved rail coverage in varying rail radii of curvatures, in accordance with preferred embodiments.
Figure 7:
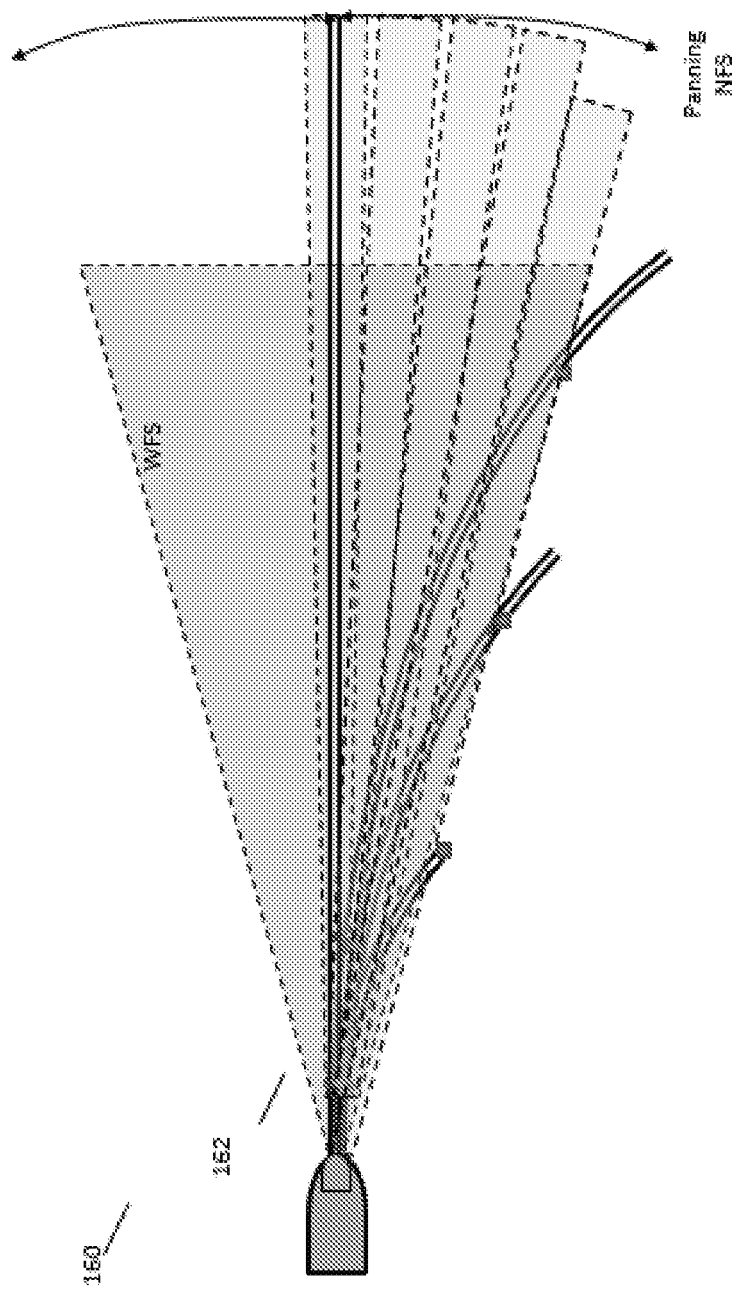
Figure 7:
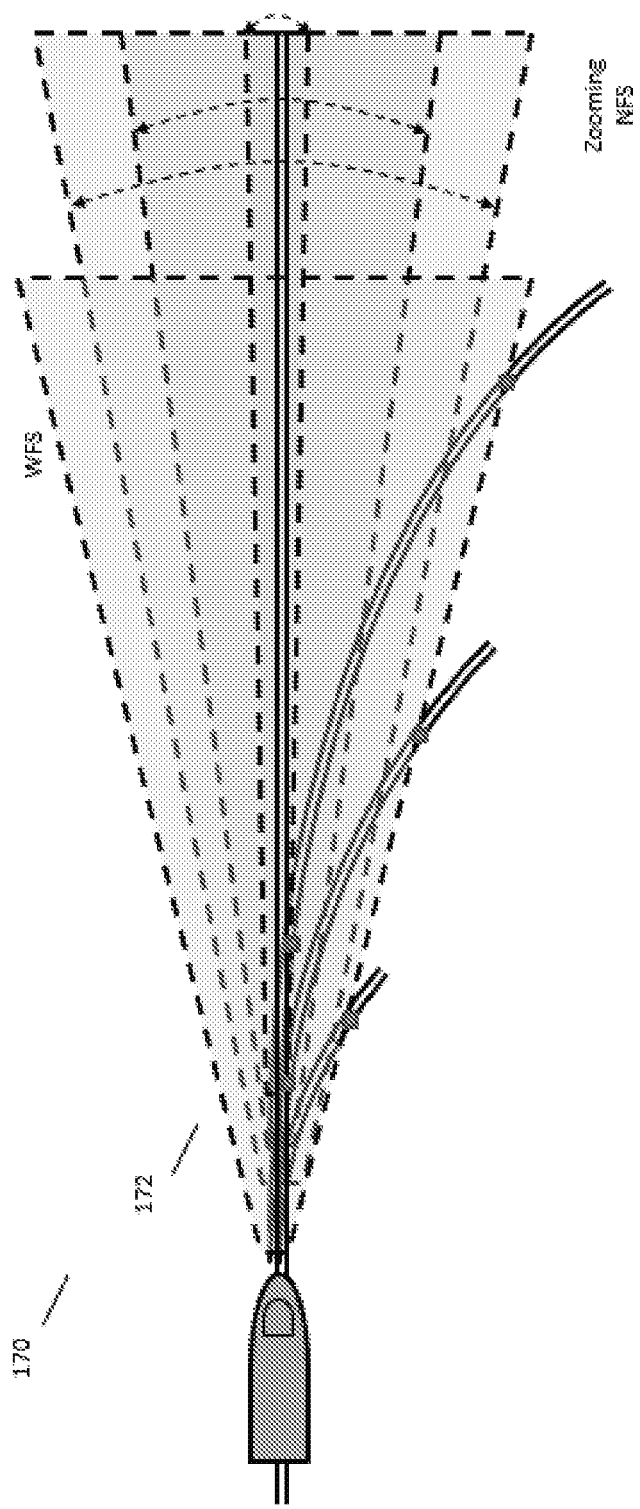
Figure 7:
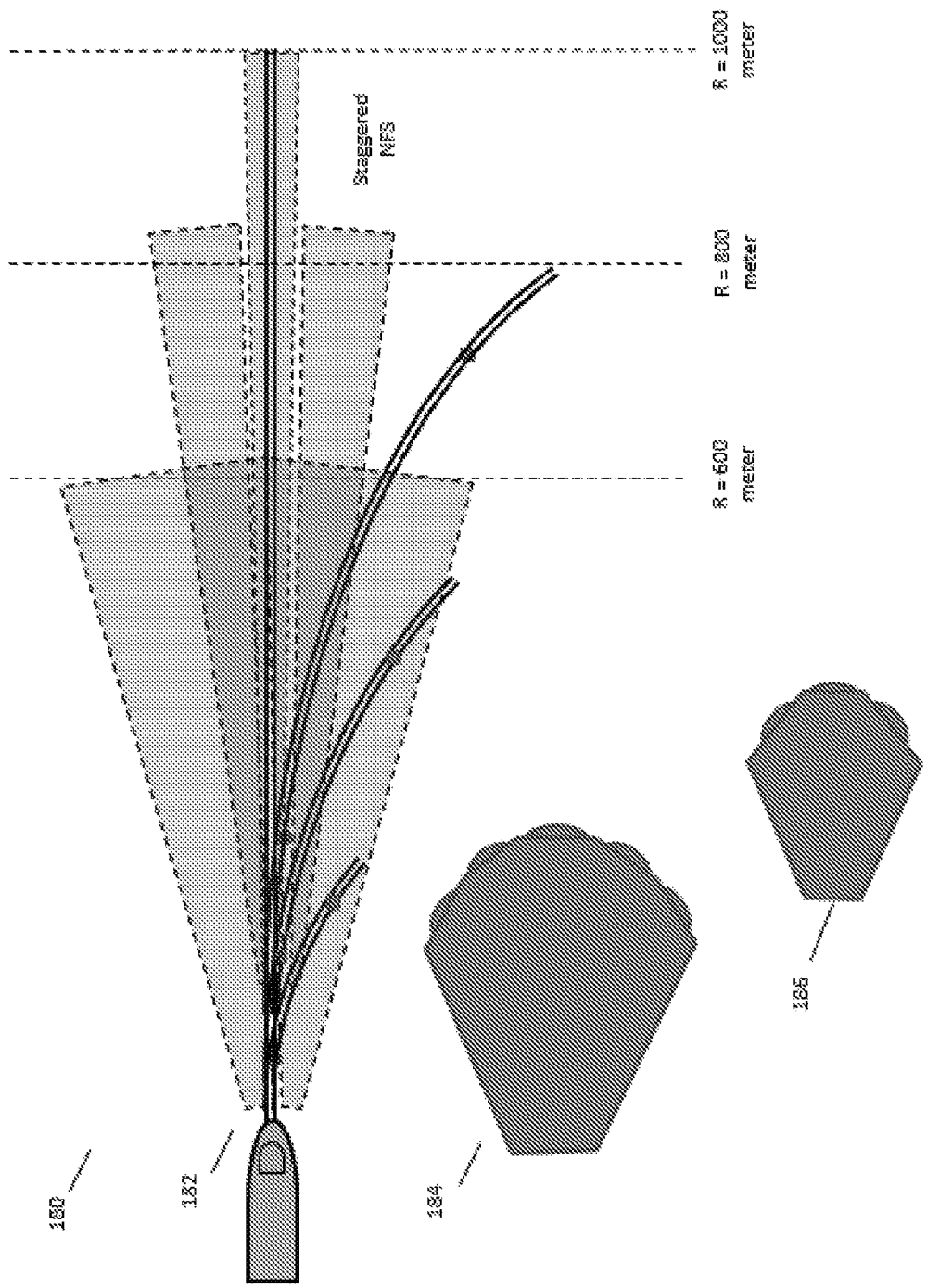

Reference is made now to FIG. 7, which is an exemplary depiction of combined coverage of imaging sensors with wide and narrow field of views, that facilitate improved rail coverage in varying rail radii of curvatures, in accordance with preferred embodiments. Exemplary top-view 142 and side-view 144 depictions of combined coverage of WFS and NFS imagers, demonstrate facilitating of improved rail coverage in varying Rail Radius Of Curvature (RROC) occurrences. In this demonstrative example, the WFS FOV (WFOV) is $2\beta$, and the NFS FOV (NFOV) is $2\alpha$. The angular arc $\theta$, that extends between the vertical axis a line that crosses the WFOV and NFOV angular boundary at a respective RROC, is given by $\theta_W=2\beta$, and $\theta_N=2\alpha$, respectively. The points of arc crossings represent a range M from the train and an offset O from the horizontal axis (or the train LOS) $M_W=RROC \times Sin\ 2\beta$ and $O_W=RROC \times (1-Cos\ 2\beta)$, $M_N=RROC\ Sin\ 2\alpha$ and $O_N=RROC(1-Cos\ 2\alpha)$. The WFS Coverage (WFSC) is given by $WFSC=2R\ Sin\beta$, and the NFS Coverage (NFSC) is given by $NFSC=2R\ Sin\ \alpha$.

Example of parametric settings defined for a particular operating point:
  (a) For a LWIR NFS pixel size of 17 um, a NFS focal length of 1.90 mm results in an Instantaneous Field OF View (IFOV) of 0.09 mr; at 1000 meters this results in a pixel footprint of ~9 cm, that is ~2 pixels per human head diameter. The resulting NFOV=3.3° and the coverage at 1000 meters NFSC=58 meters.
  (b) For a LWIR WFS pixel size of 17 um, a WFS focal length of 19 mm results in an Instantaneous Field OF View (IFOV) of 0.9 mr; at 500 meters this results in a pixel footprint of ~45 cm, that is ~3 pixels rail gauge at such 500 meters range. The resulting WFOV=33°, and the coverage at 500 meters WFSC=592 meters.

As noted above, with the selected vertical elevation angles that results in NFS maximal imaged range=1000 meters and WFS maximal imaged range=800 meters, the resulting NFS dead zone is ~157 meters and at that range NFSC=9 meters, and the WFS dead zone is ~9 meters and at that range WFSC=5 meters. Note that at such elevation angles there is considerable range overlap between the NFS and the WFS.

RROCs in the chart below are closely related to allowable train velocities:

| Rail radius (RROC) | ≤33 m/s = 120 km/h | ≤56 m/s = 200 km/h | ≤69 m/s = 250 km/h | ≤83 m/s = 300 km/h | ≤97 m/s = 350 km/h | ≤111 m/s = 400 km/h |
|---|---|---|---|---|---|---|
| Cant 160 mm, cant deficiency 100 mm, no tilting trains | 630 m | 1800 m | 2800 m | 4000 m | 5400 m | 7000 m |

-continued

| Rail radius (RROC) | ≤33 m/s = 120 km/h | ≤56 m/s = 200 km/h | ≤69 m/s = 250 km/h | ≤83 m/s = 300 km/h | ≤97 m/s = 350 km/h | ≤111 m/s = 400 km/h |
|---|---|---|---|---|---|---|
| Cant 160 mm, cant deficiency 200 mm, with tilting trains | 450 m | 1300 m | 2000 m | no tilting trains planned for these speeds | | |

Below are some computed figures depending on RROCs:

| Sensor | RROC (meters) | 500 | 1000 | 2000 | 6000 |
|---|---|---|---|---|---|
| WFS | M (meters) | 272 | 543 | 1086 | 3258 |
| | O (meters) | 80 | 160 | 320 | 960 |
| NFS | M (meters) | 29 | 58 | 116 | 348 |
| | O (meters) | 0.8 | 1.6 | 3.2 | 9.6 |

As may be noted from the above, for a LWIR NFS allowing sufficient resolution at a long range, the resulting NFOV is very small and insufficient in case of rail curves. For example for trains operating at 200-250 km/h, a minimal RROC of ~2000 meters is allowed, and for the above NFS this results in relatively short ranges of ~116 meters before the NFS coverage departs from the rails. According to a preferred embodiment for overcoming this limitation, NFS device may be adapted for panning action as illustrated in view 162. The WFS determines the general angular location of the respective rail, and the NFS is angularly directed to include the rails, at a desired range, in its FOV, by using, for example, an external panning mirror or a mechanical panning unit of the entire NFS.

According to another preferred embodiment, which is illustrated by view 172, the NFS includes a zoom capability, such that the NFOV is increased to enable wider angular coverage in case of tightly curved rail situations or decreased in order to gain longer ranges. Although the increased NFOV is achieved via reduced resolution, this is typically compensated by the fact that ranges of interest are generally shortened in curved rail situations due to, for example, LOS obstructions.

Another preferred embodiment is illustrated by view 182, whereby multiple staggered NFS imagers are incorporated with varying focal lengths and width of the FOVs, thereby covering the extended angular Field Of Regard (FOR) without any moving parts, while providing added reliability. The amount of NFS imagers to be used may vary as a function of requirements and system requirements, as illustrated in view 184 that depicts coverage achieved by using live NFS imagers, and view 186 depicting coverage achieved by using only three NFS imagers. Combinations of multiple NFS imagers and a WFS imager are also possible.

The combined use of WFS and NFS imagers is generally called for as required detection ranges increase for high speed trains, depending on specified stopping distances. As the train's speeds decreases, for example in the case of city trams and slow urban trains, a WFS may be sufficient as detection ranges and stopping distances are significantly reduced. Therefore the combined use of WFS and NFS imagers is modular, whereby the WFS and NFS imager configurations may be designed as add-ons such that a generic ROAS may be designed, allowing for modular extensions thereby supporting a variety of slow and fast moving trains.

Figure 8:
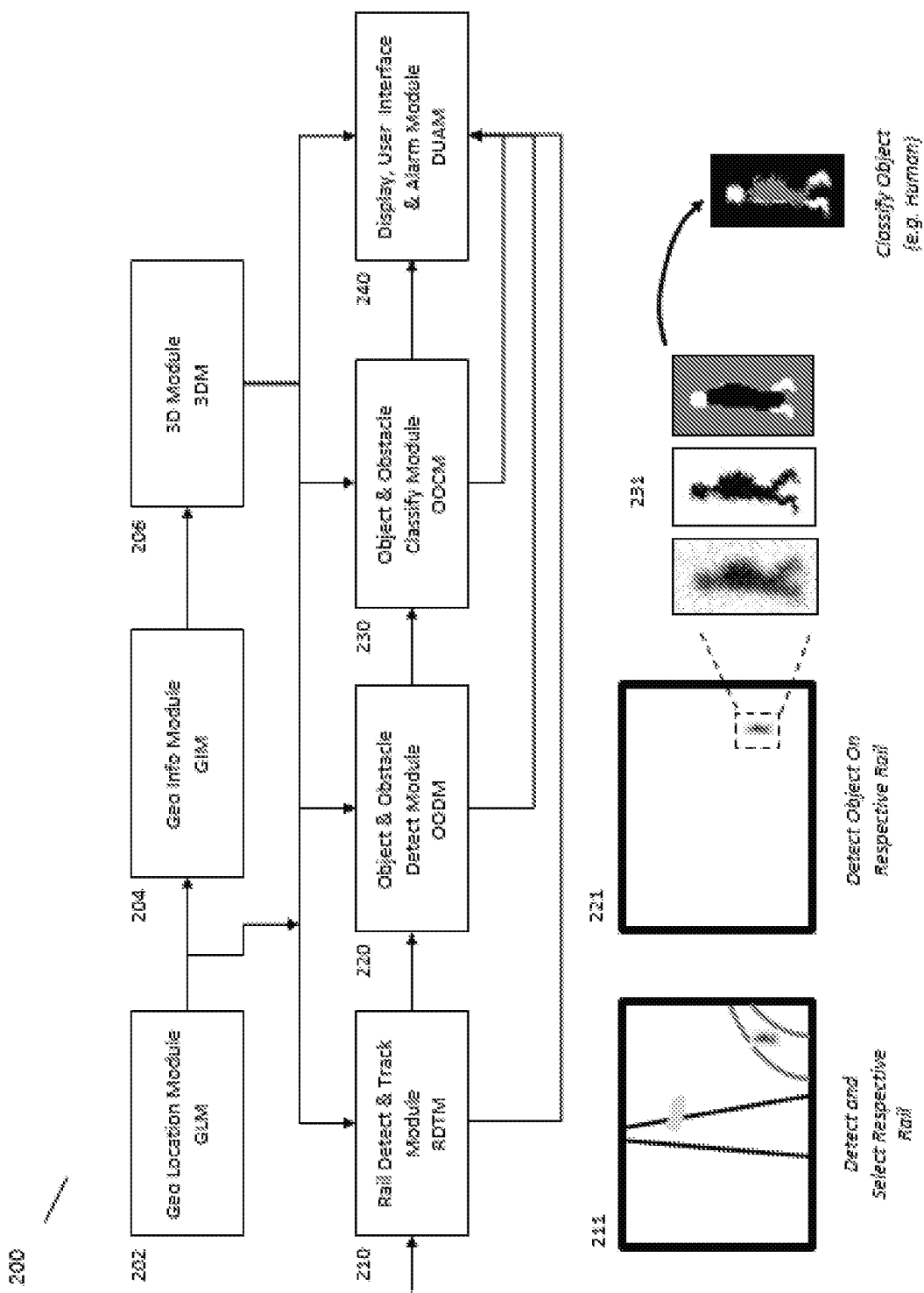
FIG. 8 is a block diagram and illustration of an embodiment of the present disclosure comprising a process of automated object and obstacle detection, tracking and classification based on video/vision processing augmented with geo location sensing and geo information and rendering.

Reference is made now to FIG. 8, which is a block diagram of method, performed by an apparatus comprising an on-board forward looking imaging unit, for a ROAS according to embodiments of the present invention. The method detects and classifies objects and obstacles along railways, whereby a) such stationary objects may be located between rails, on rails and in the vicinity of rails, and b) moving objects having paths that may result in impending collisions with the moving train. The process provides automated object and obstacle detection, tracking and classification, based on video/vision analytics processing, preferably augmented with geo location sensing and geo information and rendering.

As depicted in FIG. 8, ROAS, a method and apparatus 200 are presented that incorporate forward looking imaging sensors, preferably but not limited to a Long Wave Infra Red (LWIR) imager and a visible band imager (VIS), and further preferably combines such forward looking imagers in providing real time imagery which is analyzed in real time. Apparatus 200 comprises GEO location module (GLM) 202 for providing location readings, GEO information module (GIM) 204 for processing the CEO readings, and 3D module (3DM) 206 for processing and providing 3D GEO information.

The analysis of the obtained imagery information is based on image processing and vision processing algorithms that generally apply four main processing functional modules, a Rail Detect and Track Module (RDTM) module 210, an Object and Obstacle Detect Module (OODM) module 220, an Object and Obstacle Classify Module (OOCM) module 230, and a Display. User interface and Alarm Module (DUAM) module 240. The first three modules, 210, 220 and 230, may be applied separately from the LWIR and the VIS imaging sensors. Alternatively, such LWIR and VIS image/video outputs may undergo an image fusion process, in which case the first three modules may be applied to the fused imagery video stream. All first three modules may generally be fed into the DUAM module 230, both in separate processes or as fused video stream implementations as noted above.

The main function of the RDTM (Rail Detect and Track Module) is illustrated by module 211, which is adapted to detect, track, map and designate the respective rail associated with the train, thereby enabling the subsequent selective detection of objects and obstacles in the determined rail map. Unit 221 illustrates the function of the OODM within the rail map region. Objects and obstacles are detected within the rail map area, and subsequently classified as illustrated in Unit 231.

The processed imagery output of the ROAS may preferably be augmented with geographical information that assists the ROAS in better responding to various situations. Such geographical information may be derived from the GLM module 202 (comprising for example a GPS, INS etc.), the GIM module 204 and the 3DM module 206, all of which provide important real time auxiliary data for the ROAS solution processing. The GLM module 202 may provide real time location and derived speed) information which is essential for monitoring various train safety criteria. The GLM module 202 together with the GIM information may provide real time 3D geographical information regarding the railway layout and 3D terrain data, wayside infrastructure equipment (e.g. signaling posts, electrical equipment, rail turnouts and switches), rails crossings etc. The product of the GIM module 204 may be fed into the 3DM module 206 for generating camera view point of the 3D information, for utilization in a GBRM (Geo Based Rail Map) that can be combined with the IBRM (image Based Rail Map) in providing a robust solution for a variety of typical train operational situations and in achieving improved ROAS performance.

Figure 9:
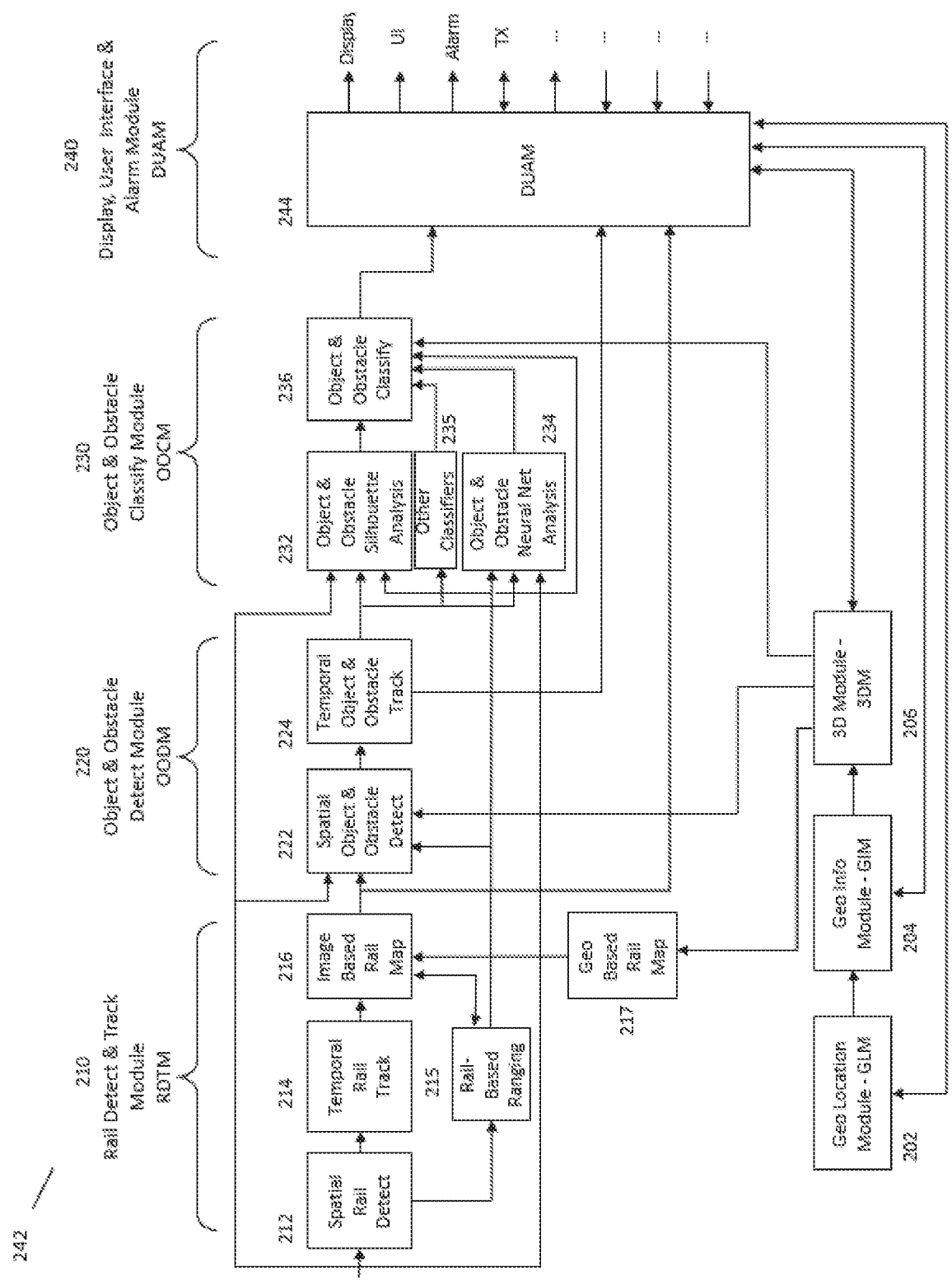
FIG. 9 is a detailed block diagram of an embodiment of the present disclosure comprising a process of automated object and obstacle, detection, tracking and classification based on video/vision processing augmented with geo location sensing and geo information and rendering.

Reference is made now to FIG. 9, which is a detailed block diagram 242 of a process of automated object and obstacle detection, tracking and classification based on video/vision analytics processing, preferably augmented with geo location sensing and geo information utilization, according to embodiments of the present invention.

According to a preferred embodiment the RDTM module 210 may comprise a spatial rail detect (SRD) function module 212, a temporal rail track (TRT) function module 214, a range based ranging (RBR) function module 215, and an image based rail map (IBRM) function module 216, preferably augmented with a geo based rail map (GBRM) function module 217. The SRD module 212 is adapted to spatially detect the rails in each subsequent image, and the TRT module 214 is adapted to track the detected rails over time as they may shift ('pan') in the image frame location and/or their image orientation may change from frame to frame ('rotate'), depending on the changing rail geometries and radii of curvatures, rail switching etc. From the tracked rails a continually updated IBRM may be generated. The SRD module 212 feeds into the RBR function module 215 that is adapted to determine the range from the imaging sensor to each part/section of the detected rail, whereby the range may be determined, for example, based on the known (i.e. standard) gauge (inter-rail) distance and the imaging sensor optical resolution (pixel site and focal length).

The IBRM as depicted and described above, e.g. in FIG. 1, is of particular importance as it addresses various complex railway detection situations. Railways are often characterized by single rails along which trains may travel alternatively in either directions, however not concurrently, or multiple rails allowing concurrent travel along two directions. Railways are also characterized by multiple crossings, turnouts and slips that allow for respective rail switching. The RDTM is adapted to continually determine, the railway segment that is currently visible to the respective imaging sensor, and to generate the IBRM which outlines the image regions which may include potential obstacles that are to be detected by the subsequent OODM processing.

The IBRM may preferably be augmented by, and/or be fused with a GBRM, data from GBRM module 217 thereby addressing and overcoming issues such as rail occlusions in curved rail situations. 3D terrain changes where image of a rail may be occluded by a rapid terrain altitude drop, an upcoming rail crossing which may exhibit intermittent changes in rail contrast, wayside infrastructure etc.

In a preferred embodiment the OODM Unit 220 may comprise a Spatial Object and Obstacle Detect (SOOD) function module 222 and a Temporal Object and Obstacle Track (TOOT) function module 224, adapted to receive the input image, and the IBRM module 216 and RBR module 215 outputs. Objects and obstacles of interest are to be preferably spatially detected in respective IBRM sub-modules. Such and objects and other objects may be stationary or moving, and in both cases due to the motion of the on-board imaging sensor all objects (stationary and non-stationary) may exhibit some motion in the image frames sequences generated by the imaging sensor. The RBR module 215 is adapted for determining the shape and dimensions of range-dependent spatial detection filters. For different categories of objects, their image motion may be profiled based on size determination at each such image location and the associated derived range.

In a preferred embodiment the OOCM (Object and Obstacle Classify Module) 230 may generally comprise a classification object and obstacle classification (OOC) function module 236, that is preferably adapted to receive outputs from at least an object and obstacle silhouette analysis (OOSA) module 232 and/or an object and obstacle neural net analysis (OONNA) module 234. Such analysis and classification is preferably performed only in localized regions where objects and obstacles have been detected and tracked by the OODM module 220. The RBR module 215 may also be useful in controlling at least scaling features of the analysis and classification functions. The OOCM module 230 may be a machine learning process, whereby both the OOSA module 232 and the OONNA module 234 are trained on various object and obstacle imagery, and applied locally to selected detection areas. The OONNA module 234 may also incorporate its own detection process instead of module 220.

The DUAM (Display, User Interface and Alarm Module) 240 may generally serve to display useful outputs of the processing modules, to support various user interfaces, and to generate various alarms, safety and communications functions. The DUAM module 240 may also receive various inputs from the GLM module 202, GIM module 204 and 3DM module 206.

Figures 10, 10A:
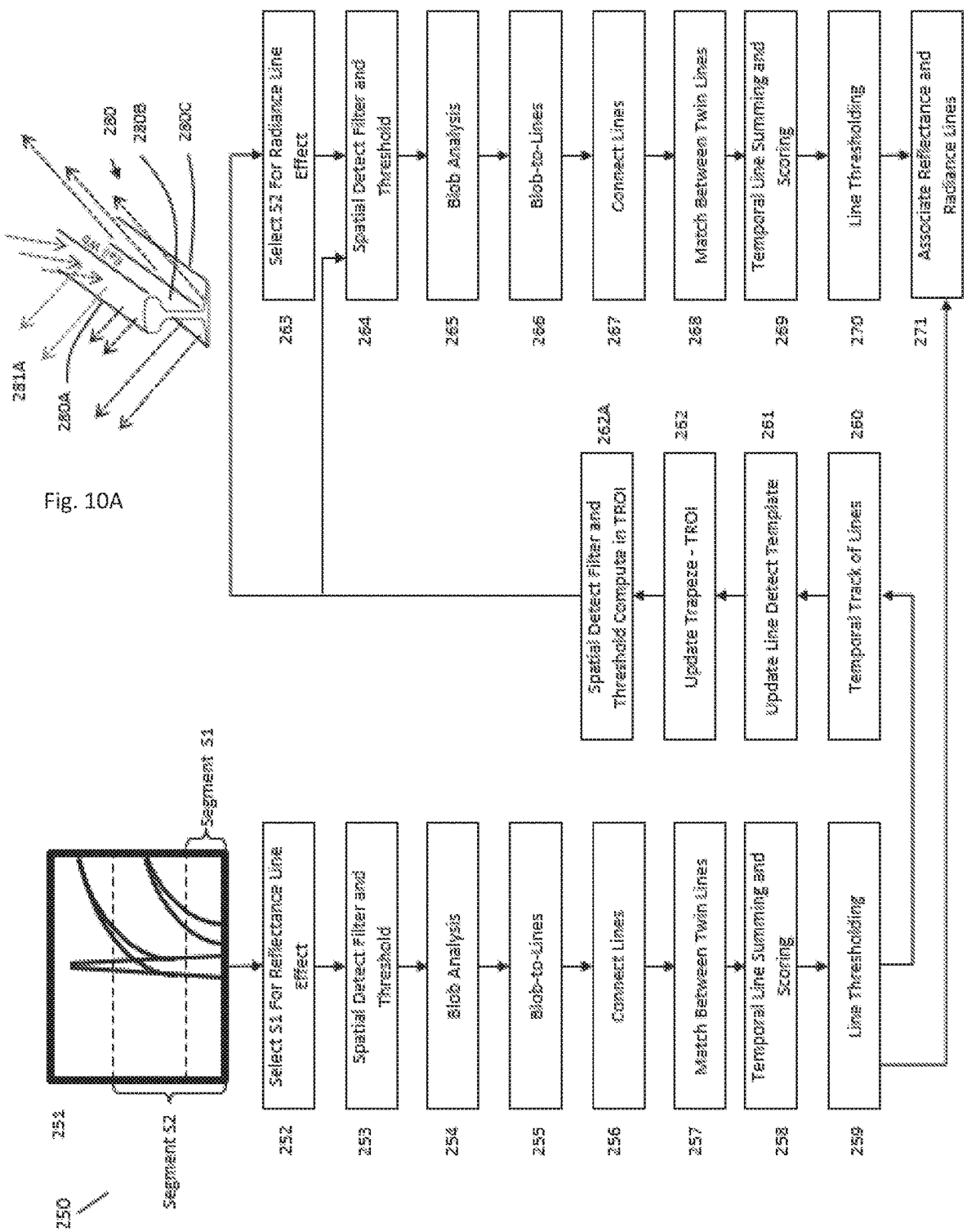
FIG. 10 is a detailed block diagram of an embodiment of the present disclosure comprising an exemplified rail detect and track process.
FIG. 10A depicts thermal distribution along a typical rail of a train.

Reference is made now to FIG. 10, which is a detailed block diagram 250 of an embodiment of the present disclosure comprising an exemplified RDTM (Rail Detect and Track Module). An RDTM may be designed for both a WFS imager and an NFS imager, whereby parametric modifications may allow for optimizations of each such imager. Moreover, a handover mechanism may be added to facilitate the handshake operation between the two imagers such that the WFS imager can readily designate expected rail positions in the NFS imager obtained scene. Module 250 provides a preferred embodiment of RDTM process, whereby the obtained image received from the imager(s) may be divided, in step 251 into at least two segments, a first (lower) segment covering the short range—S1, and a second (larger) segment covering both the short and longer ranges—S2.

The selective use of S1 and S2 is designed to exploit a distinct physical thermal effect of rails as depicted in FIG. 10A to which reference is made now also. Unit 280 illustrates a steel rail comprising a rail head 280A, rail web 280B and rail foot 280C. The rail head 280A is typically a flat top surface with rounded corners and generally highly reflective along the rail due to the constant polishing by passing train wheels, thereby segment 280A is reflecting sky radiance (depicted by arrows 281A), which is generally considerably colder than ground and air temperature. Contrarily, the web segment 280B and foot segment 280C are relatively hotter than the rail head segment 280A due to beat absorbed form the ground. In white-hot display presets of LWIR imagers, the sky appears black and the rails head, when observed at sufficient ground resolution, appears black as compared to ground and to other parts of the rail (e.g. web and foot segments). As imaging distances increase, the ground resolution decreases and the narrow reflective section is averaged by the imager pixels together with radiant rail sections (e.g. unpolished parts of the rail head, rail web and rail foot), whereby the radiant behavior of the rail is generally diffusive due to its surface roughness and varying levels of surface rust. Generally the rail emits higher flux than ground and other rail-related infrastructure. Relative radiance behavior will change in varying temperature weather conditions, including precipitation, snow etc. similar reflectance effect is exhibited in visible band of VIS imagers, whereby the sky/sun reflectance is generally higher than ground and rail infrastructure.

The reflectance effect at short ranges, e.g. segment S1, is significant and enables the RDTM to effectively and robustly identify and lock on the respective rails of the train within an acquired image, and is further used to improve the detection of rails at the longer ranges in the image segment S2 by using the distinct transition from the sky reflectance to radiance. The advantageous utilization of the combined reflectance-radiance effect of rails and their detection and tracking is a key element of this disclosure and invention.

The above is described in more detail in block diagram 250, whereby in stages 252-262 identification of the rails in segment S1 is performed, and in stages 263-270 identification of the rails in segment S2 is performed. Finally at stage 271 association of the rails identified in segment S1 and in segment S2 is carried out to ensure proper continuity based on handshake between the two processes.

In stage 252 the dimension of the S1 is determined, depending on system configuration parameters and defaults. In stage 253 a detection filter is applied that is designed to detect rail structure. One preferred implementation is a convolution of the difference between two center-surround Median Filters (MF), whereby the dimensions of the filters depends on respective WFS and NFS IFOVs and selected ranges at which the rails are to be detected. Exemplary settings for the Detection Filter (DF) include the following:

$$DF=MF[5\times5]-MF[21\times5];$$

where the respective dimensions are [Horizontal×Vertical], and the DF output is then subjected to a threshold using DF histogram statistics within respective segments, as follows:
 (a) LWIR imager/white-hot setting: a negative threshold T1=−k1σ for reflectance detection and a positive threshold T2=k2σ a for radiance detection, and
 (b) VIS imager: a positive threshold T3=k3σ for specular reflectance detection and a negative threshold T4=−k4σ for diffusive reflectance detection.

At stage 254 a blob analysis is applied to detection region of graphical interest. At stage 255 a thinning process is applied (e.g. skeletonizing or averaging horizontal extremal pixels in each row within the blob area), resulting in candidate lines, which are then may locally be connected at stage 256. Since the process is meant for seeking rail pairs, preferably a rail matching, the process at stage 257 is applied to filter out rails which do not have any matching rail in preset (gauge) lateral distances. At stage 258 a temporal summing and scoring function is applied, whereby lines that appear in spatial vicinity over time get an incremental increase in their score, while an intermittent disappearance or non-detection of the line in a given frame reduces the score incrementally. The temporal scoring is subjected to a threshold in stage 259, and lines exceeding the threshold are fed into a line tracking function process at stage 260 where tracking of the respective lines over time as a function of line shifts and orientations is performed. At stage 261 the designated rail map segment section 56 (FIG. 1) for segment S1 is updated, and within a trapeze region of interest (TROI) region the DF output standard deviation σ is recomputed at stages 262, 262A. The TROI σ figure may subsequently be used for positive threshold determination kσ of the larger segment S2 at stage 263 in detecting the rail radiance (bright pixels in white hot LWIR) and using the DF output at stage 264 for updating the spatial detect filter threshold. In stages 265-270 detection of rails in segment S2 is carried out in a similar fashion to the process applied for segment S1. Finally, at stage 271 the respective reflectance (dark) and radiance (bright) detected lines are associated spatially and temporally, resulting in uniquely delineated rails.

Figure 11:
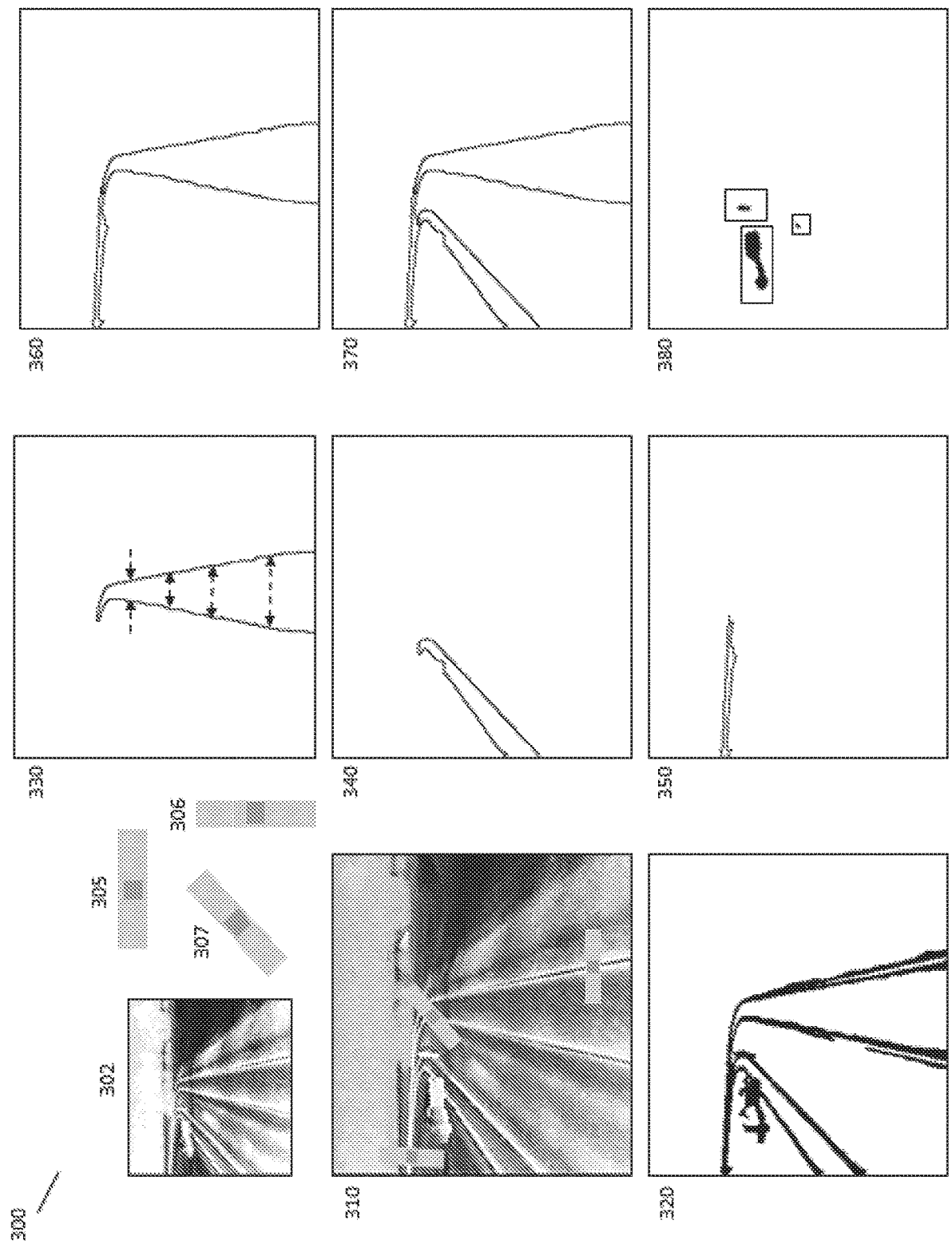
FIG. 11 depicts an exemplary rail detect and track process, that combines rail based ranging and object detection in the vicinity of the detected rails, in accordance with embodiments of the present disclosure.

Reference is made now to FIG. 11 depicts an exemplary rail detect and track result sequence, that combines improved rail detection, rail based ranging and object detection in the vicinity of the detected rails, in accordance with embodiments of the present disclosure. A given segment of rails is depicted in view 302. Assuming a vehicle is positioned on the left rail, and a human is standing between the two rails. Typically, rails may have some parts that are approximately vertical in the frame, while along curves the rails may be oriented diagonally with respect to the frame borders and toward the distal end parts the rails may be oriented approximately horizontally. In such situations, the DF center-surround geometric configuration may be adapted to improve its response to the varying orientations of the rails in the image. Segments 305-307, as positioned in view 310 over segments of the rails, illustrate such modified geometrical orientations that can match the rail orientations present in the image, as depicted in Unit 310. A viable approach may be to run three discrete DF orientations and at each pixel location selecting the maximal response of the filters as they best match the rail orientation. View 320 illustrates the preliminary detection of rails and objects in the vicinity of rails all appear in black on a white background. In this particular example, the rail regions are further segmented into three sub-regions (based on orientation and rail based ranging), namely
 (a) the primary (proximal) rail region shown in view 330,
 (b) the secondary (adjoining, left of the first rail region) rail region as shown in view 340, and
 (c) a region where the two rails appear substantially as a joined line and cannot be differentiated as shown in view 350. In view 360 the combination the first and third sub-regions are depicted logically in determining the primary rail path in the image. Similarly, as shown in view 370, all three sub-regions are logically combined in order to enable determining whether objects detected on, between and adjacent to the respective rails, are part of the rails or other element, such that upon detection of foreign objects respective signal may be issued to enable proper response. Detected object are shown in view 380, separated from processed images of the rails.

Figure 12:
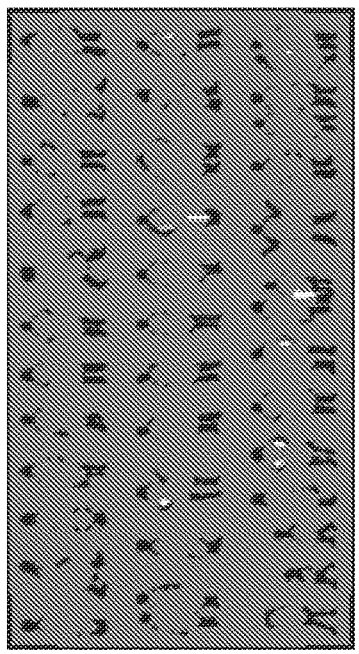
FIG. 12 depicts an exemplary set of human object silhouettes and a result of morphological processing that decomposes the silhouettes into adjoining partitions that may be used to classify the said human objects, in accordance with embodiments of the present disclosure.
Figure 12:
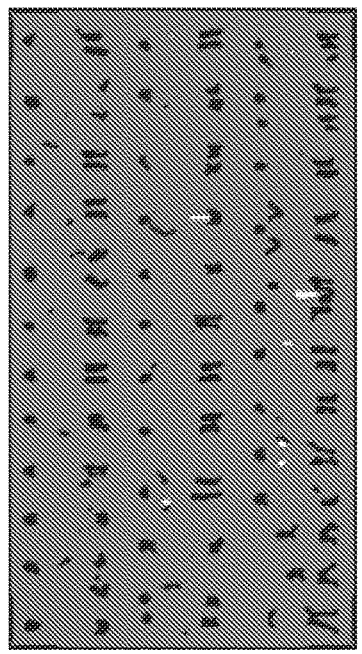
Figure 12:
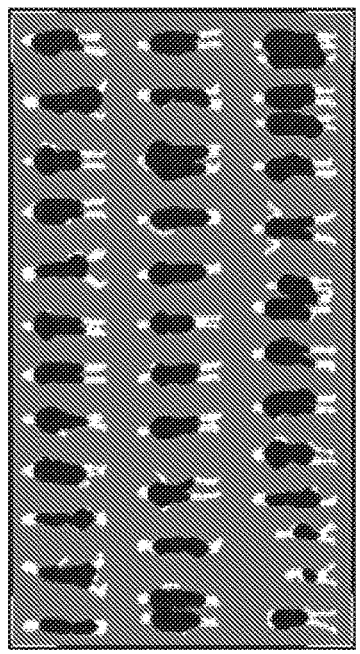
Figure 12:
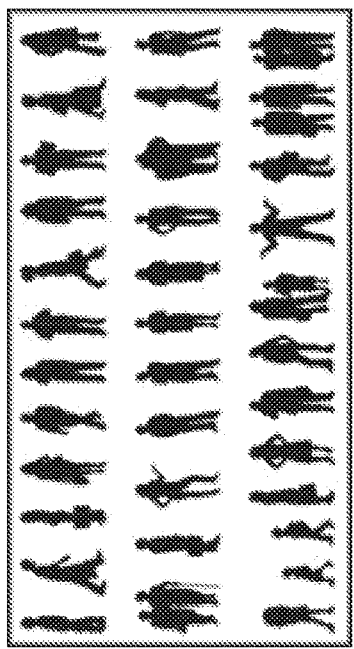
Figure 12:
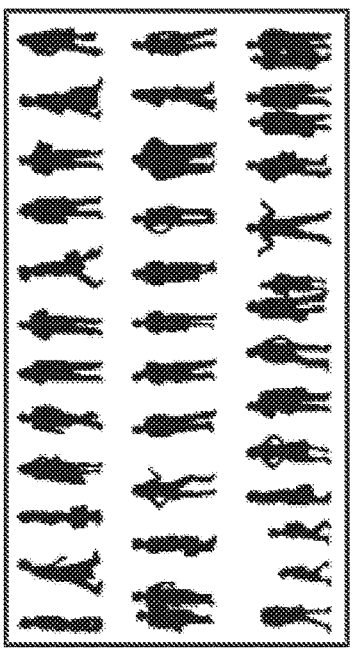
Figure 12:
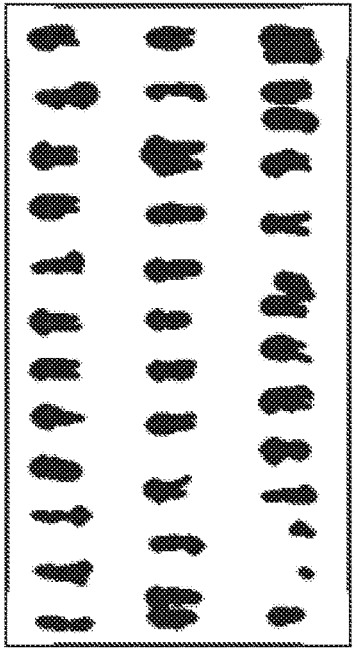

Reference is made now to FIG. 12, which depicts an exemplary set of human object silhouettes and a respective result of morphological processing that decomposes the silhouettes into adjoining partitions that may be used to classify the human objects, in accordance with embodiments of the present invention. As provided in FIG. 9 block diagram 242, and specifically by modules 232, 234, 235 and 236, object and obstacle classification is preferably provided by combining various classification approaches including, for example, silhouette analysis and neural net analysis.

Throughout this disclosure, when referring to detection and classification, it is intended that multiple complementary imagers may preferably be used (e.g LWIR, VIS) in order to provide improved and robust performance. In terms of object detection, thermal imagers (e.g. LWIR) provide improved object detection due to their ability to sense radiative effects (rather than reflective effects) which depend more on the object radiative signature and less on ambient and directional illumination. Thermal signatures therefore typically provide more stable silhouettes of radiating objects such as human or animal, although often they too may have some limitations, for example, depending on human clothing and on-body carried artifacts, thermal signatures and silhouettes may vary. For such reasons, it is often preferable to use more than one imager, preferably using different spectral bands that can complement each other.

Figure 13:
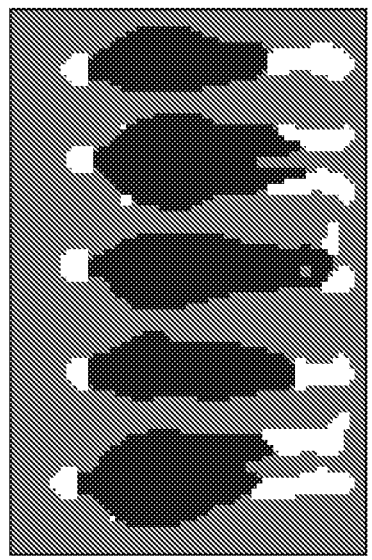
FIG. 13 depicts an exemplary set of human and animal (donkey) silhouette examples, and a result of morphological processing that decomposes the silhouettes into adjoining partitions that may be used to classify the said human objects, in accordance with embodiments of the present disclosure.
Figure 13:
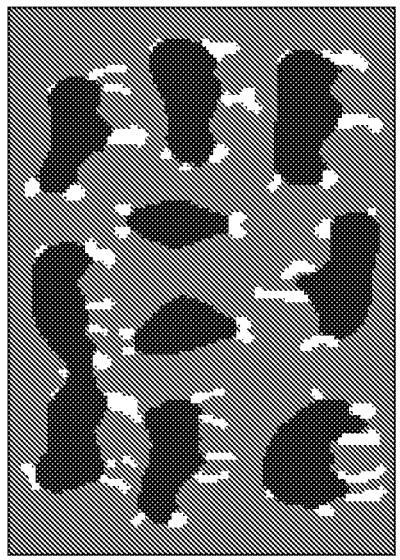
Figure 13:
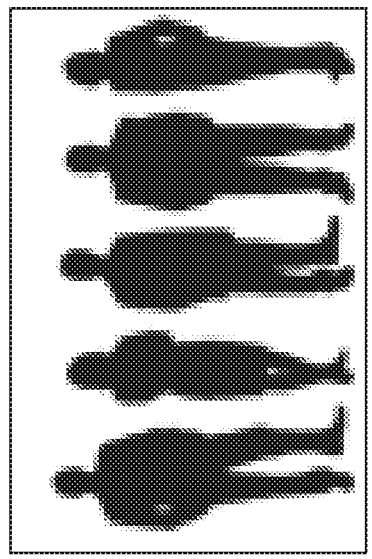
Figure 13:
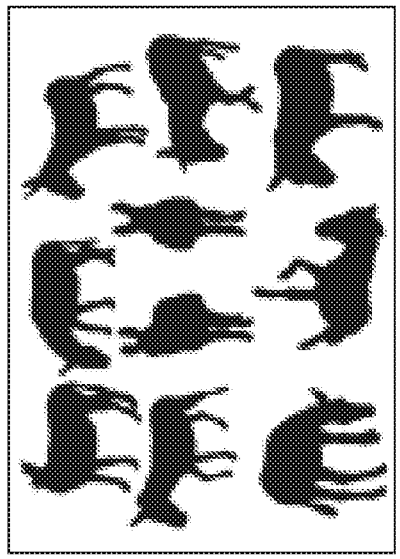

Assuming silhouettes are a viable approach for classification and differentiation between humans, animals and manmade objects, it is therefore necessary to develop silhouette analysis approaches, as provided in FIGS. 12 and 13. Typically, humans and animals exhibit specific structural and thermal signatures, generally characterized by:

(a) enlarged thermal mass (enlarged and elongated vertically for standing humans, and enlarged and elongated horizontally for standing animals), and (b) extremal thermal head and limbs signatures that are attached to, and positioned with respect to the main thermal mass signature. Such partitioning of human and animal silhouettes may well provide a basis for their detection, as well as classification and differentiation between each other. For ROAS applications, the ability to differentiate between humans and animals is important in providing effective safety means and control, and is therefore a key element of this disclosure of the invention.

As shown in FIG. 12, view 402 depicts a set of slightly smoothed ("softened") silhouette examples at a given resolution, and view 404 presents the binary result of a simple thresholding operation acted on the silhouettes of view 402. Views 406, 408, 410 and 412 present, respectively, intermediate and final exemplary results of a set of morphological, arithmetic and logical operations on the 'binarized' silhouettes of view 404, illustrating the ability to differentiate and partition body central mass from extremal body elements such as head and limbs (arms and legs).

The object partitioning process starts by utilizing the binarized silhouettes in view 404. View 406 depicts the result of selecting only black silhouette pixels, and on them applying an exemplary 3×3 or 5×5 MF (median filter) in several repeated iterations thereby removing body extremities (e.g. head, arms, legs, protruding, shoulders and elbows). A MF that generates an non binary output will require an additional zero thresholding. View 408 depicts the result of subtracting the images of view 406 (as received from the images in view 404) and adding a constant 128 level (median) offset for display purposes (i.e. gray level 128 in the image is the subtracted value zero). View 410 presents the result of applying a noise reducing 3×3 MF that removes edge spurious effects, and the images depicted in view 412 are the result of a logical AND operation between the images depicted in view 406 and the inverse (INV) of the respective images of view 410. The resulting depiction as presented in view 412 has three grey levels. Black connected blobs are considered as representing body mass, white connected blobs are considered as representing body extremities and adjoining the black body mass, and grey represents the background. The geometrical relations between the adjoining blobs are used to classify the objects.

View 430 FIG. of 13 depicts a set of examples of human silhouettes at a higher resolution, and the result of the silhouette partitioning process is depicted in view 435. The processed images of view 430 are presented in view 435 and again exemplify the ability to correctly separate limb and head partitions (presented as white stains) from central body mass (presented in black blobs). View 440 depicts a set of silhouettes of a donkey in various aspects and positions, and view 445 illustrates the partitioning results of the process described above, illustrating the ability to differentiate body central mass from extremities (e.g. mouth, ears, limbs). The processing scripts, and particularly the dimensions of such operators, depend closely on the estimated range to the said objects. Therefore, the ability to detect rails and derive rail based ranging is key feature for the silhouette partitioning process.

Figure 14:
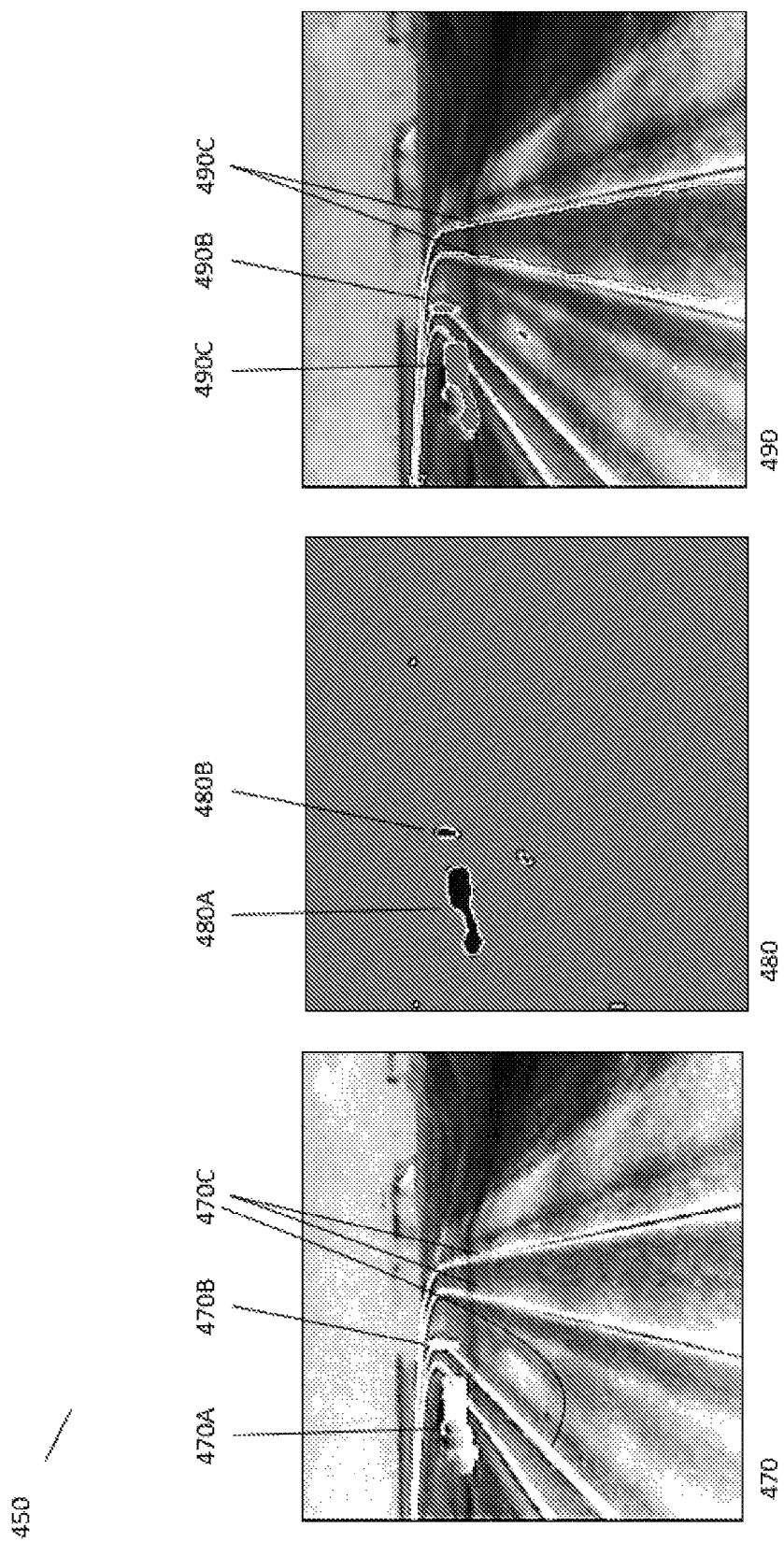
FIG. 14 depicts an example of rail detect and object detect whereby the objects include a vehicle and a human in the vicinity of detected rails, and a result of morphological processing that decomposes the detected silhouettes into adjoining partitions that may be used to distinguish and classify the said objects, in accordance with embodiments of the present disclosure.

FIG. 14 depicts the feature of rail detection and object detection as applied to the example in FIG. 11. In that example the scene comprises objects which include a vehicle 470A and a human 470B in the vicinity of detected rails 470C, and a result of applying classification by object partitioning processing on the images of view 470 decomposes the detected silhouettes into adjoining partitions that are subsequently used to distinguish and classify the said objects, in accordance with embodiments of the present disclosure. View 480 presents only the blob 480A associated with the vehicle and blob 480B associated with the human, where the rails are removed, exemplifying the ability to distinguish potential obstacles from rails. View 490 presents a composed view showing the rails 490C, the vehicle 490A and the human 490B, where the various objects are clearly distinguished from each other.

Figure 15:
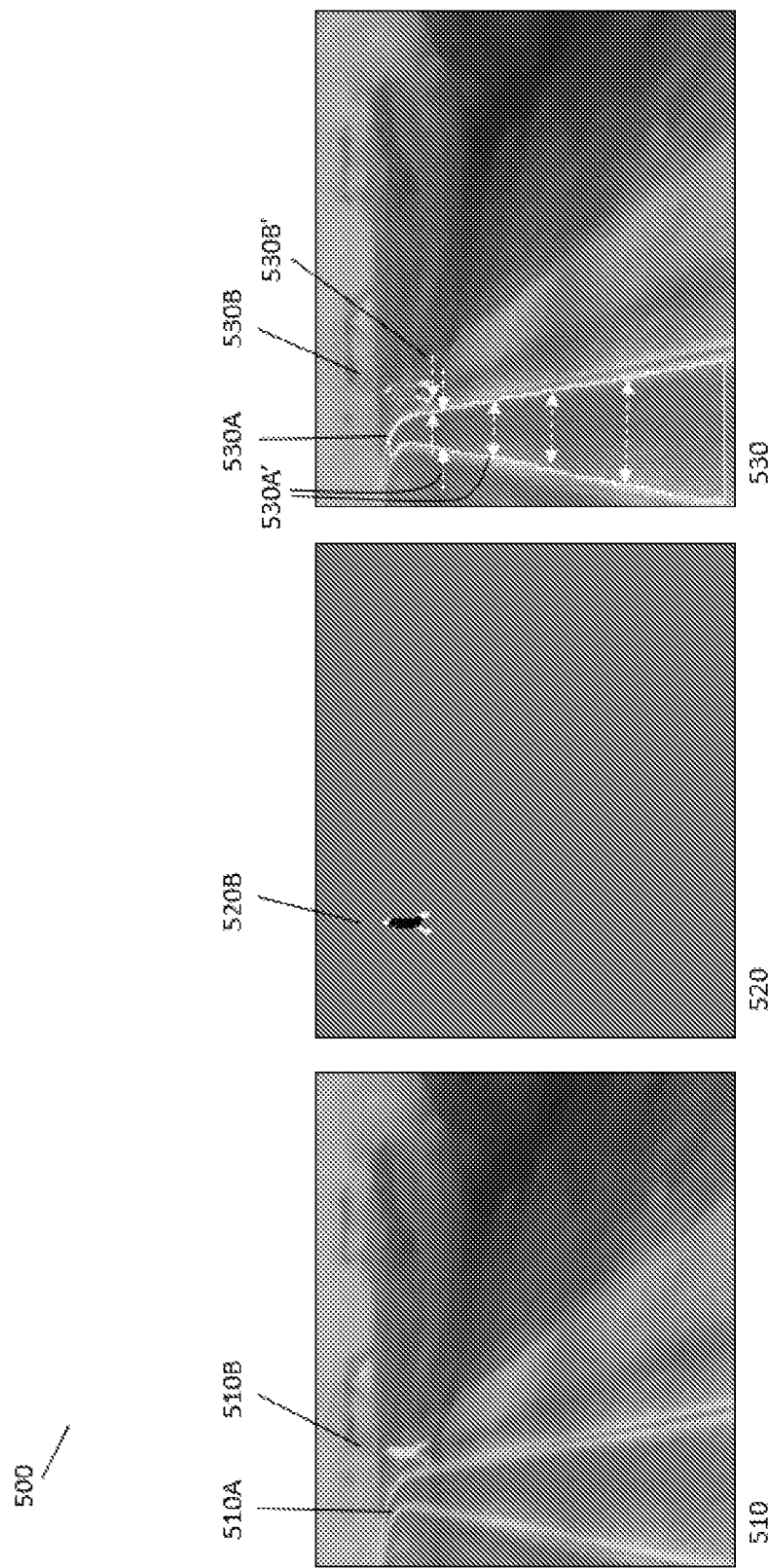
FIG. 15 depicts an example of rail detect and object detect whereby a walking human crosses the detected rails, and a result of rail based ranging and morphological processing that decomposes the detected silhouette into adjoining partitions that may be used to distinguish and classify the human objects, in accordance with embodiments of the present disclosure.

Reference is made now to FIG. 15 that depicts an example of views 510, 520 and 530 presenting all detection and object detection in a scenario where a walking human crosses the detected rails, and a result of the classification process described above employing object partitioning processing which decomposes the detected silhouettes into adjoining partitions that are subsequently used to distinguish and classify the said objects, in accordance with embodiments of the present disclosure. View 510 presents the image as may be received from the imager(s) used by the system. View 510 comprise images of rails 510A and of a human next to the rails 510B. Applying the process of classification by object partitioning processing on the images of view 510 decomposes the detected silhouette into adjoining partitions that are subsequently used to distinguish and classify the said objects, in accordance with embodiments of the present disclosure. View 520 presents only the blob 520B associated with the human's image 510B, where the rails are removed, exemplifying the ability to distinguish potential obstacles from rails. View 530 presents a composed view showing the rails 530A, and the human 530B, where the lateral distance 530B' of the human from the rails may be calculated based on the comparison of this distance to the rails gauge 530A' that is a known number.

Figure 16:
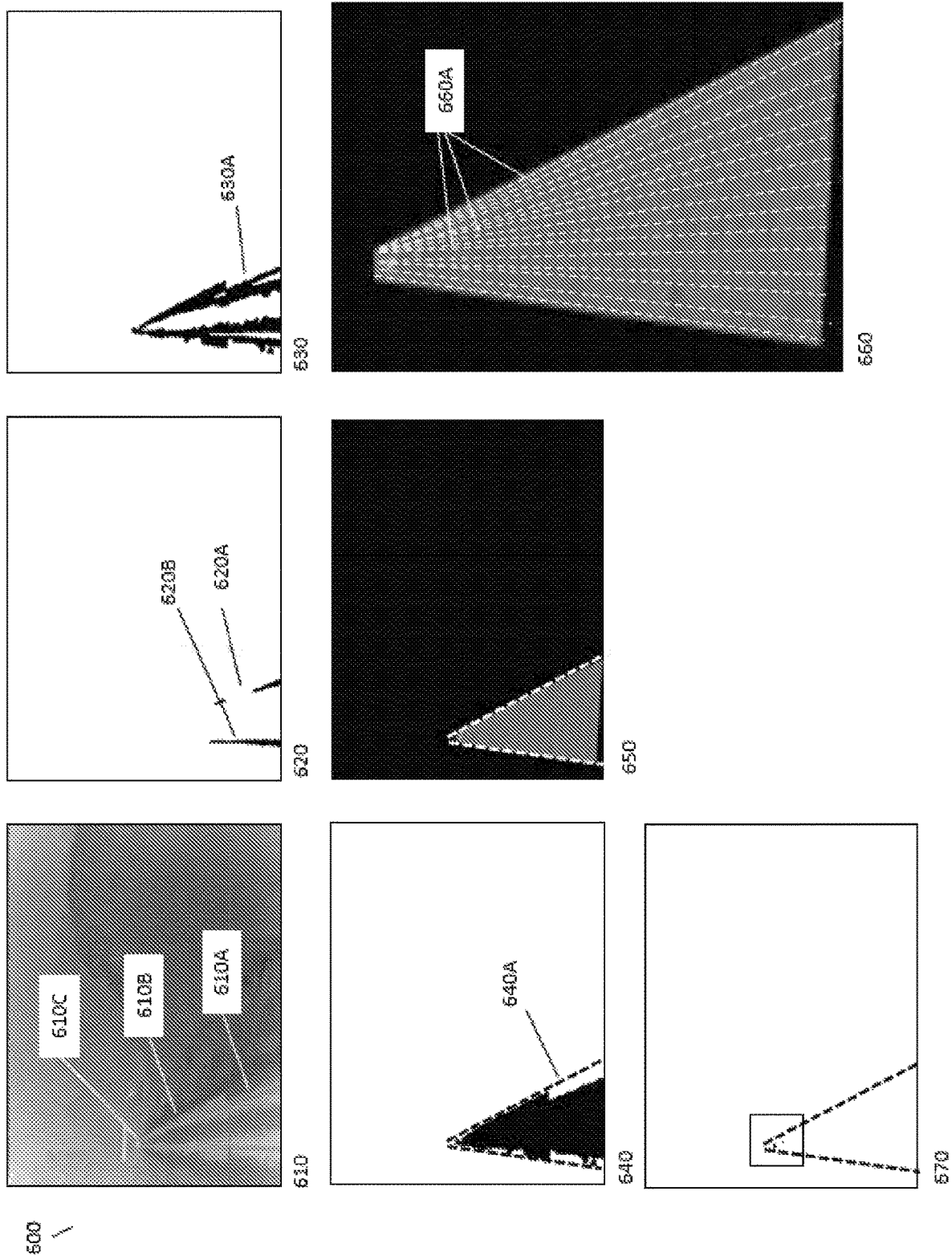
FIG. 16 depicts an exemplary rail scene, whereby the rail is partially detected, and a computed rail map is used to detect small objects located in the vicinity of the rails at long distances, in accordance with embodiments of the present disclosure.

Reference is made now to FIG. 16 which depicts an exemplary rail set 600 of scenes, whereby the rail is partially detected, and a computed rail map is used to detect small objects located in the vicinity of the rails at long distances, in accordance with embodiments of the present disclosure. Partial-only rail detection in LWIR imagery may occur as a result of adverse weather conditions such as rain and snow, whereby thermal contrasts are reduced (e.g. thermal contrast "washout"). As shown in view 610 the segments 610A of the rail has a reduced rail contrast, as compared to the other segments 610B of the rail infrastructure contrast, that has increased considerably. With the LWIR imager white-hot setting, a thermal blob 610C of a contrast of a remote cow standing between the rails at a distance of approximately a 1000 meters range. View 620 depicts the detected rail reflectance component 620B at close range in accordance with the above described process, whereby it is noted that the rail reflectance component remains comparatively detectable and image segment 620A is associated with rail segment 610A having low thermal signature. View 630 depicts the radiance component detection of the rail, and here clearly the rail radiance has been relatively washed out at segment 630A, however the railway infrastructure has become more pronounced as compared to the adjoining ground background (between and outside of the rails). The combined reflectance and radiance detection is however sufficient to generate the rail map IBRM as illustrated in view 640, whereby the dark filled region is the segmented IBRM, and the bounding broken lines 640A estimate the full lateral extent of the IBRM which is considered rail vicinity for detecting objects. View 650 depicts the output of an exemplary Object Detection Filter (ODF), that is based on an oriented high pass or band pass filter that derives the localized filtering orientations from the IBRM geometry, as exemplified by the broken 660A lines in view 660, thereby improving the detection sensitivity in the rail vicinity with minimal disturbances or false detections from the rails themselves as illustrated in view 670.

Figure 17:
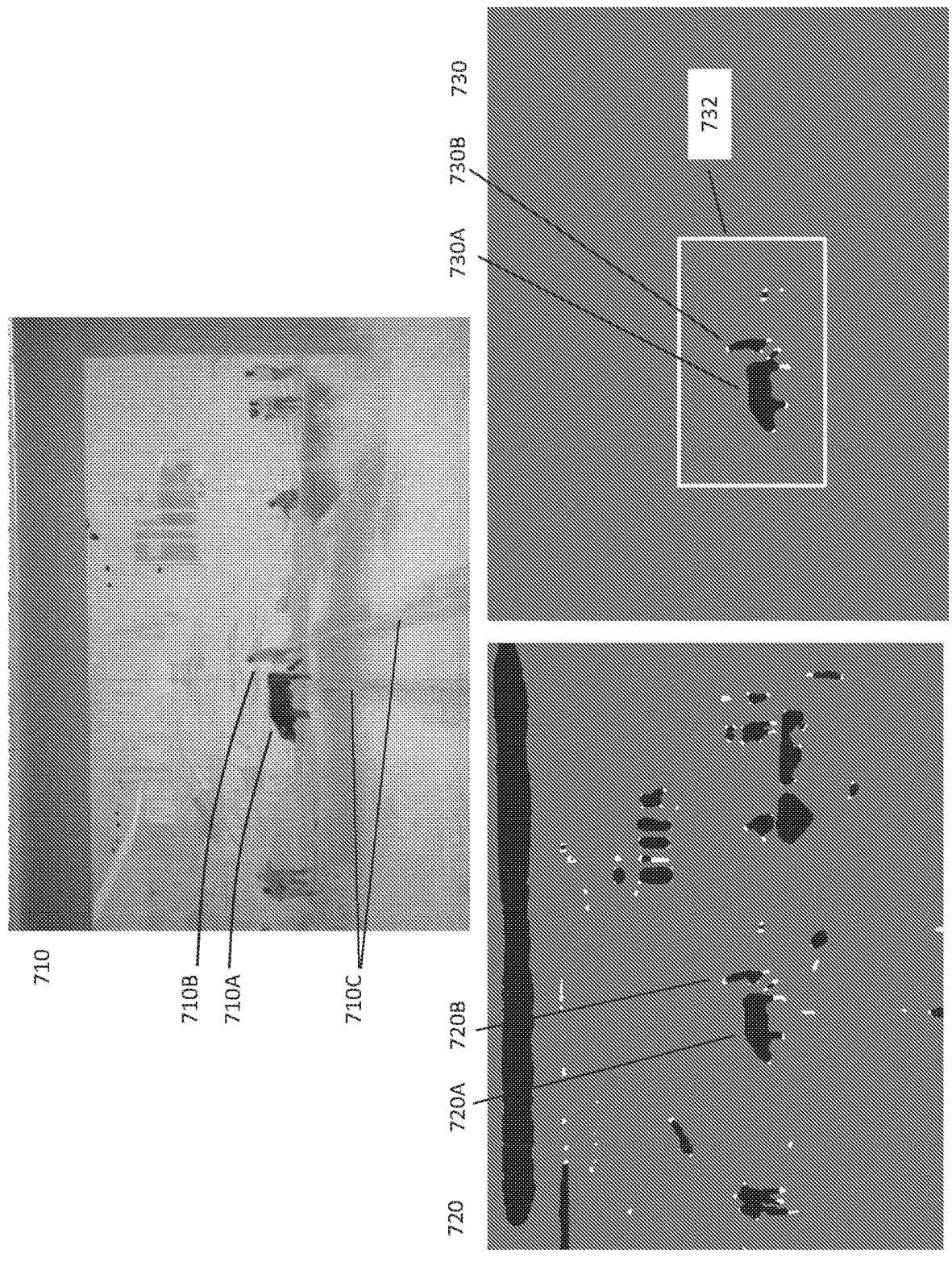
FIG. 17 depicts an example of object and obstacle detection and silhouette partitioning for classification purposes as guided by rail detect, rail based map and rail based ranging, and whereby the process is applied to the entire image and subsequently extracted from a localized window in the vicinity of the rails at a desired range, in accordance with embodiments of the present disclosure.

Reference is made now to FIG. 17, which depicts an exemplary scenario view 710 of a cow 710A and human 710B crossing the rail 730C at a level crossing, and an of object and obstacle detection and silhouette partitioning process for classification purposes provided by a RDTM, IBRM, RBR and OOCM and depicted in view 720, whereby the process is applied to the entire image, and subsequently extracted from a localized window 732 (sub section of the image) in view 730 where the respective blobs of the cow and the human are marked 730A and 730B, respectively, in the vicinity of the rails at a desired range, in accordance with embodiments of the present disclosure.

Figure 18:
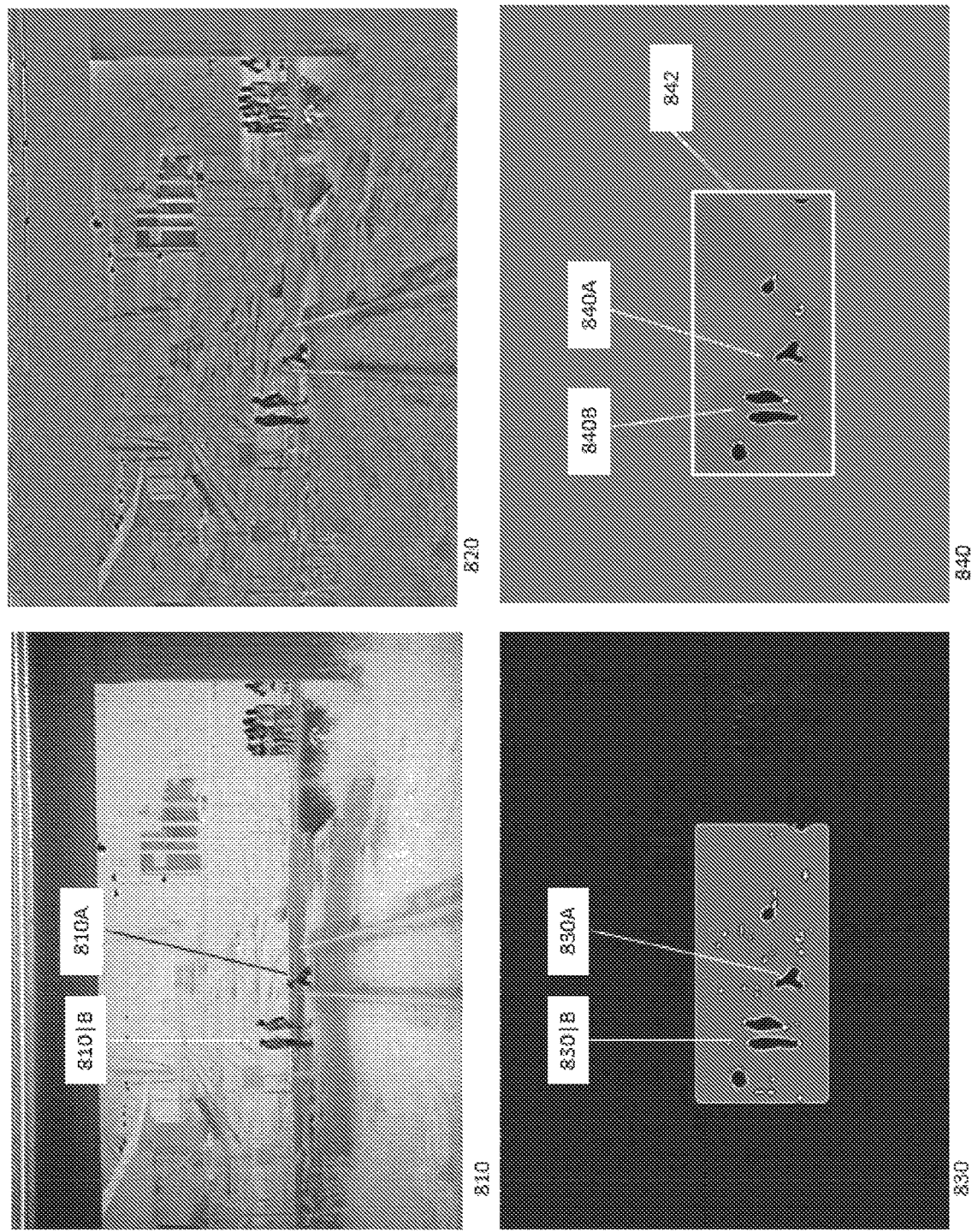
FIG. 18 depicts an example of object and obstacle detection and silhouette partitioning for classification purposes as guided by rail detect, rail based map and rail based ranging, and whereby the process is applied within a localized window in the vicinity of the rails at a desired range, in accordance with embodiments of the present disclosure.

Reference is made now to FIG. 18, which depicts an exemplary scenario view 810 of a dog 810A and nearby humans 810B standing at a level crossing, a pre-processed image view 820 using a Dynamic Range Compression (DRC) operation, and an of object and obstacle detection and silhouette partitioning process for classification purposes provided by a RDTM, IBRM, RBR and OOCM as depicted in view 830 comprising the blobs associated with the dog 830A and the two persons 830B, whereby the process is applied locally within a localized window 842 in the vicinity of the rails at a desired range, and further selected blobs 840A of the dog and 840B of the humans, that correspond to object partitioning criteria view 840, in accordance with embodiments of the present disclosure.

Figure 19:
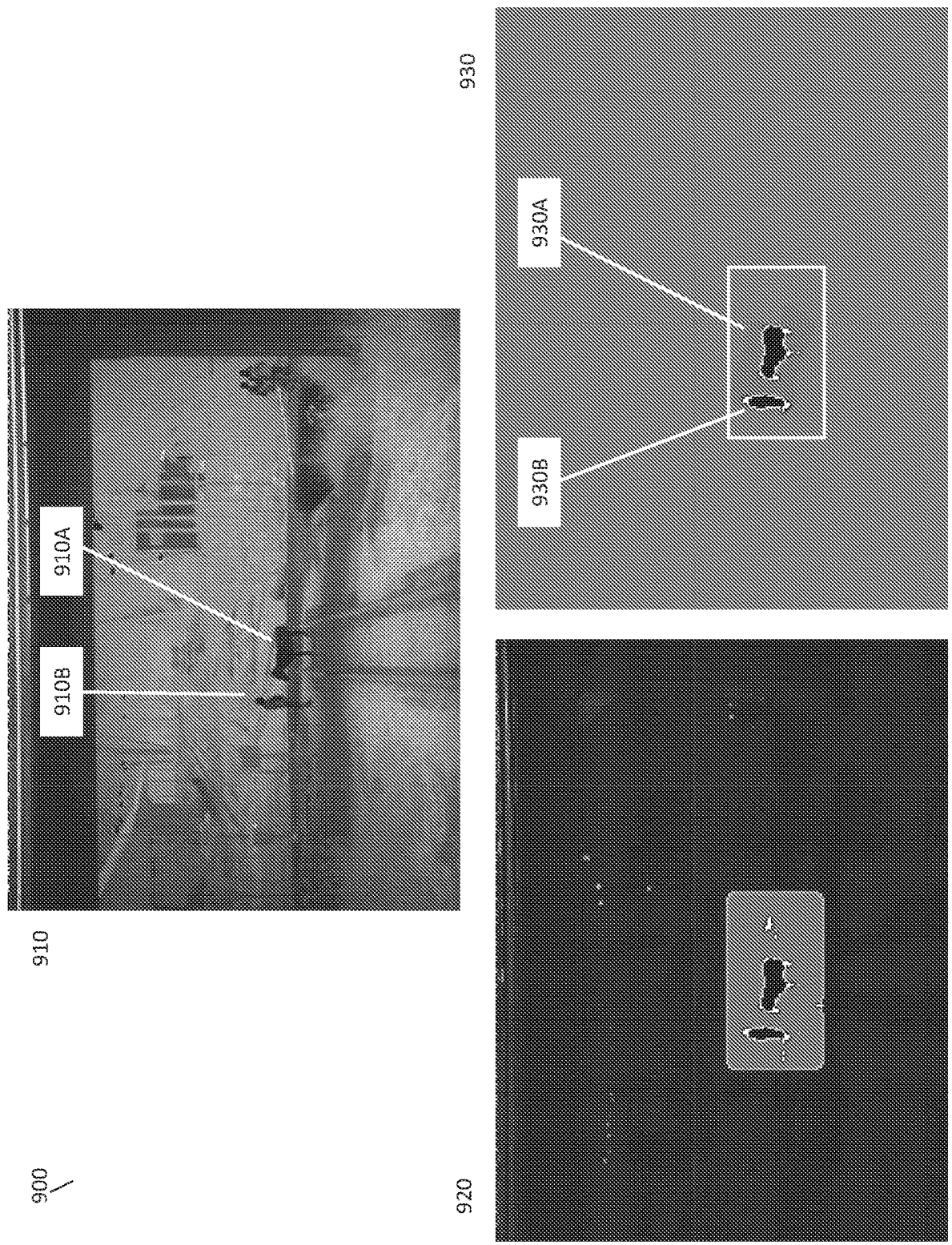
FIG. 19 depicts another example of object and obstacle detection and silhouette partitioning for classification purposes as guided by rail detect, rail based map and rail based ranging, and whereby the process is applied within a localized window in the vicinity of the rails at a desired range, in accordance with embodiments of the present disclosure.

Reference is made now to FIG. 19, which depicts an exemplary scenario view 910 of a donkey 910A and nearby human 910B standing at a level crossing, and an of object and obstacle detection and silhouette partitioning process for classification purposes provided by a RDTM, IBRM, RBR and OOCM as depicted in view 920, whereby the process is applied locally within a localized window in the vicinity of the rails at a desired range, and further selected blobs that correspond to object partitioning criteria view 930, in accordance with embodiments of the present disclosure.

Figure 20:
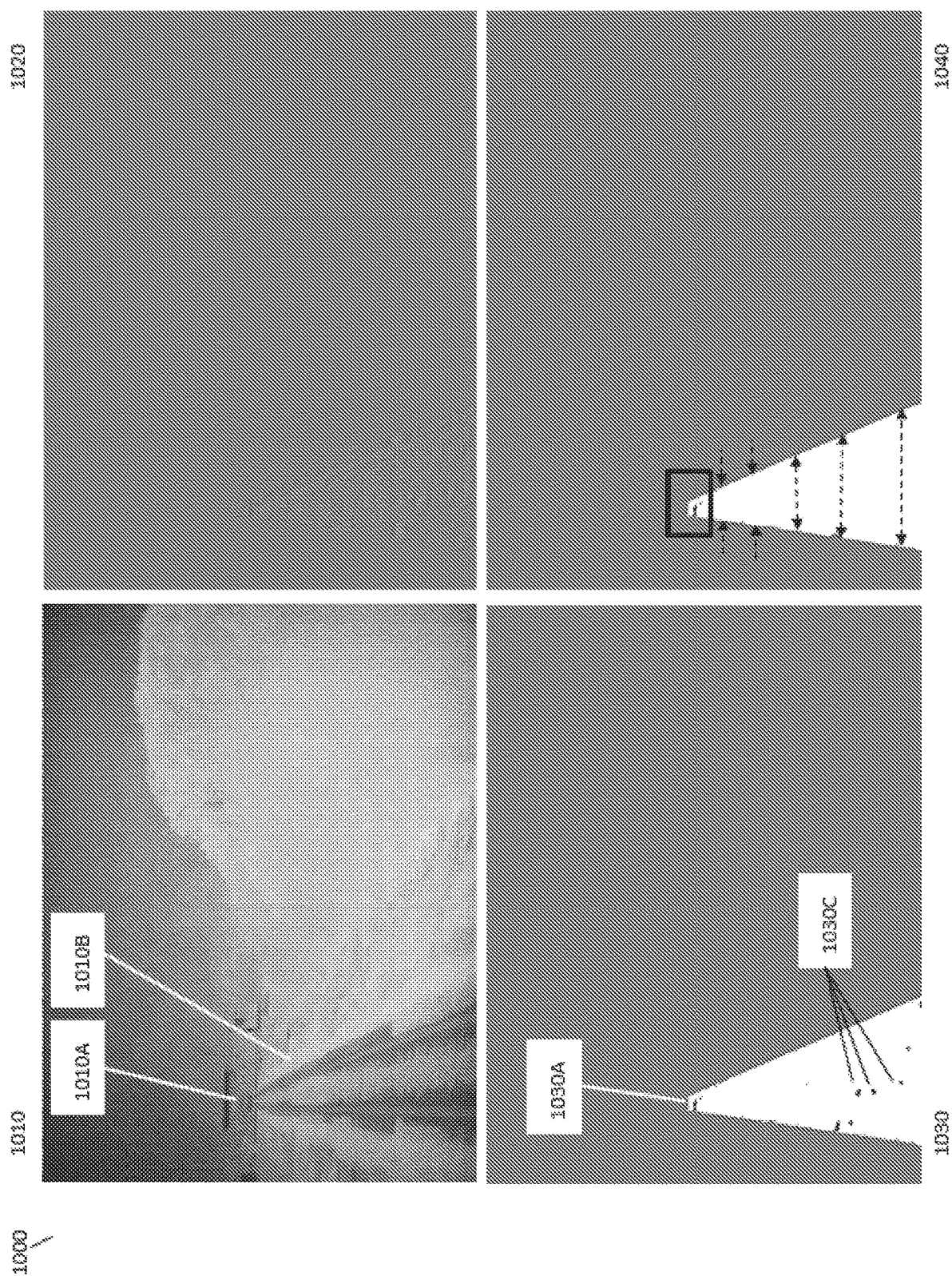
FIG. 20 depicts another example of object and obstacle detection as guided by rail detect, rail based map and rail based ranging, and whereby the process is applied within a designated image based rail map with the rail map being used to discard detection candidates that do not comply with size based criteria, in accordance with embodiments of the present disclosure.

Reference is made now to FIG. 20, which depicts another example presented in view 1010 in similar conditions and processing approach as applied with respect to the views of FIG. 16, where the imaged object 1010A is a vehicle with a very low contrast standing at long range (~1000 meters) across a rail level crossing 1010B. View 1020 depicts an exemplary ODF within the IBRM, and view 1030 illustrates detected blob 1030A of the vehicle at the top narrow part of the IBRM and other detected blobs 1030C at closer ranges. View 1040 illustrates the advantage of using the RBR (Rail Based Ranging) in discarding detections which do not comply with size criteria, in this case the small size of blogs 1030C, as deducted relying on RBR processing, is considered too small to pose a threat to the train.

Figure 21:
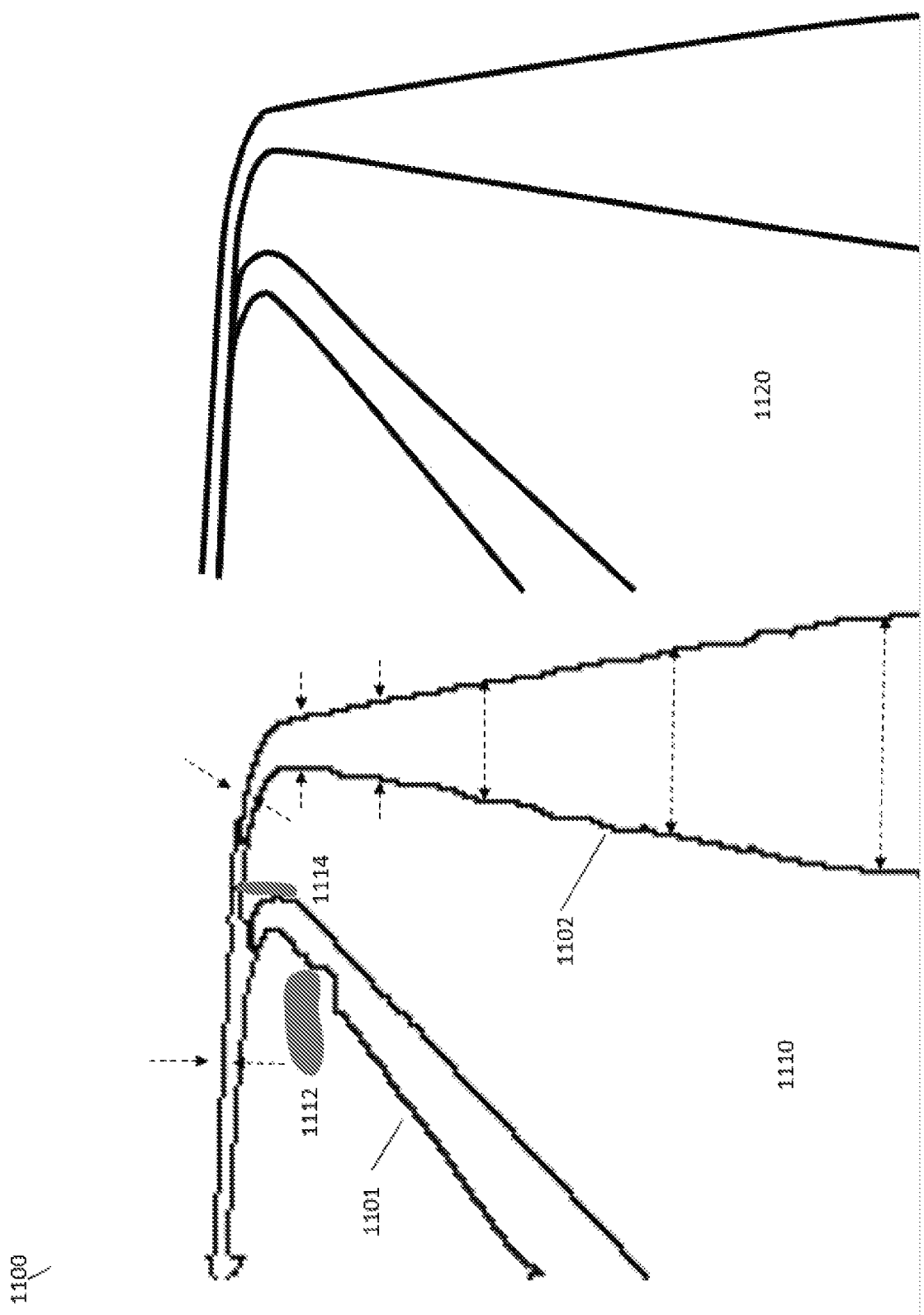
FIG. 21 depicts an example of rail detect, rail based map and rail based ranging, as compared to a respective geo based rail map, and correlating the two maps in improving the ability to detect, track and map rails in varying occluding situations, in accordance with embodiments of the present disclosure.

Reference is made now to FIG. 21 revisits the example described in FIGS. 11 and 14, whereby the detected secondary rail 1101 (left side of the primary rail 1102) in view 1100 may be more carefully analyzed in terms of:

(a) continuity of the IBRM and (b) matching between the IBRM and the corresponding GBRM.

Objects that are crossing the rails or adjacent to the rails are naturally obstructing the rails, resulting in rail distortions when applying rail detection functions. View 1110 illustrates track delineations when being partially obstructed by two objects, namely a vehicle 1112 and a standing human 1114. Note how the rail delineations become slightly distorted, thereby deviating from expected continuity criteria as to be expected from imaged rail projections. View 1120 illustrates an interpolated version of the detected rails, for example using splines or other geometrical fitting approaches. When overlaying the actual rail delineations and the smoothed (interpolated) versions, as illustrated in view 1130, various error (or distance) functions may be computed for automated detection of such rail anomalies. This may be used for improved detection of object near or on the rails, and may also be used for determining rail malfunctions and rail failures, for example in preventive maintenance applications. Moreover, View 1140 illustrates an overlay between an IBRM view 1142 (continuous line) and a GBRM view 1144 (dashed line), as described in this disclosure. Although some dynamic deviations are expected between the two, generally their combination will resolve multiple ambiguities in typical imaging situations, for example when rails disappear due to LOS obstructions resulting, for example, from terrain variations and nearby posts and structures adjoining the rails in curved rails situations. By correlating the two maps an improved capability to detect, track and map rails in varying occluding situations is achieved.

Figure 22:
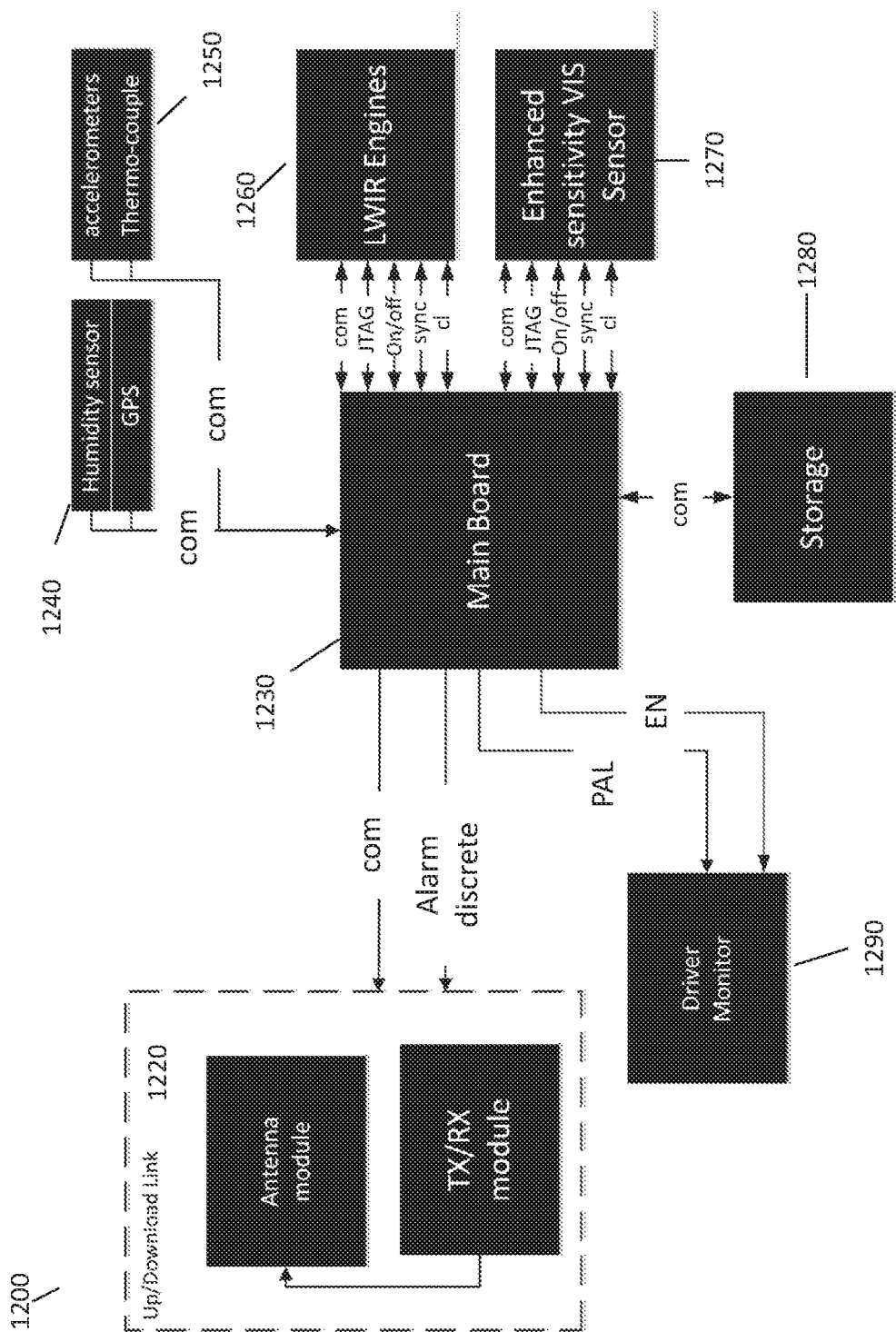
FIG. 22 describes a Railway Obstacle Avoidance System (ROAS) preferable block diagram processing configuration in accordance with this disclosure.

Reference is made now to FIG. 22, which describes a preferable block diagram 1200 of a ROAS processing configuration in accordance with this disclosure. LWIR imager implementations may be significantly improved for ROAS applications. Communication unit 1220 may comprise an antenna module and a transmit/receive module, adapted to provide for communication to external units e.g. for receiving and transmitting travel related information and for sending alarm data to external units. System 1200 may further comprise main unit/main board controller/processor 1230, in operational connection with ambient weather sensing and location sensing unit 1240, with movement sensors unit 1250, with IR imagers management unit 1260, with visible light imager unit 1270, with storage unit 1280 and with operator/engine driver I/O unit 1290. In the case of uncooled LWIR thermal imagers, there is a particular concern in the radiometric gain for extended source as compared to a point source. The gain behaves the same for a large F/#. For these kind of thermal Bolometric systems, the F/# is relatively small due the low responsivity of the bolometer. In the ROAS as provided in this disclosure, the system is designed for maximal detection performance at standoff ranges, thereby in many cases the object may be considered be a point source. The clutter which is generally uniform can be considered as an extended source. The controller/processor 1230 comprises non transitory memory unit (not shown) adapted to store executable programs that when executed perform processes and methods described in this description.

Reducing the F/# not only collects more flux and improves the contrast but changes the gain between extended and point sources.

Example: For an F/2 imager, [GEXT=17, GPS=4], and for a F/0.8 imager [GEXT=3.56, GPS=0.64], resulting in a ratio GEXT/GPS=4.25,5.56 respectively (1 is the asymptote). As is known, the irradiance on a detector from as extended-area source is obtained by dividing the flux transferred by the area of the detector:

$$E_{extended\ source} = \frac{\Phi}{A_d} = \pi L \sin^2\theta = \frac{\pi L}{\frac{4F^2}{\#} + 1}$$

Where the weight of the "1" in the denominator is typically negligible. If the optics is diffraction-limited, 84% of the flux transfer is concentrated into the image spot; therefore, the average irradiance of a point source at the detector plane is given by:

$$E_{point\ source} = \frac{\Phi}{A_d} \times 0.84 = \frac{0.84/\Omega_{opt}}{\frac{\pi}{4}d_{diff}^2} = \frac{0.84/\Omega_{opt}}{\frac{\pi}{4}\left[2.44\lambda\left(\frac{F}{\#}\right)\right]^2}$$

Figure 23:
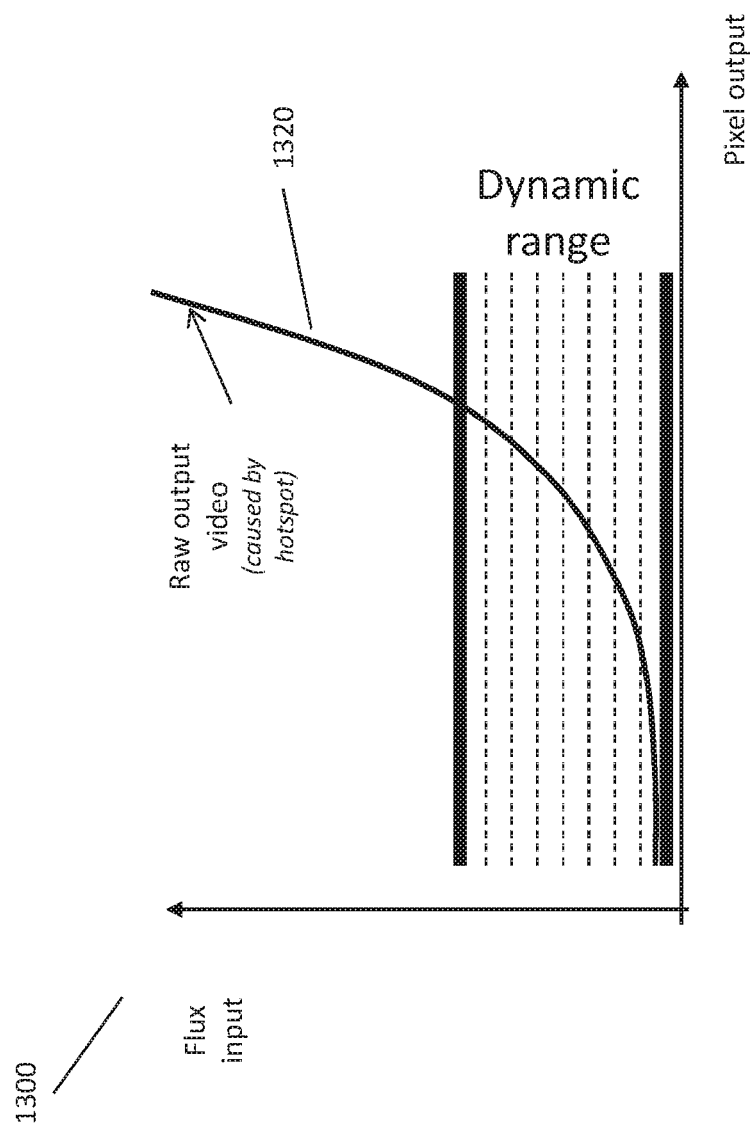
FIG. 23 illustrates a bolometric sensing curve for use of in calibration, in accordance with this disclosure.

Another improvement that relates to thermal imager is the Non Uniformity Correction (NUC) type of solutions that govern structured noise in the imagery. While there are multiple known approaches to scene-based NUC, for the present case of ROAS applications, a Rail Based NUC (RBNUC) is proposed. Bolometric detectors are based on resistance changes sensing. The flux is absorbed in the sensor's pixel and evacuates through thin legs, therefore slow discharge of the absorbed flux is caused. Continuing flux or hot spot may cause saturation of the pixel for, in some cases, many days(!) and therefore should be treated by an algorithm. FIG. 23, to which reference is made now, depicts a typical flux input/pixel output graph 1320, depicting the non-linear nature of the bolometric type of imager sensor. Due to the relative nature of temperature measurement for retrieval of absolute values calibration of the sensor is required. According to embodiments of the present invention advantage may be taken of the uniformity of the temperature of rail pixels throughout substantially the entire scene, to be used as a dynamic reference for absolute measurements, NUC and hotspot correction. A preferably open frame LWIR engine can provide a convenient platform for such algorithm implementations (e.g. RBNUC, DRC etc.).

Figure 24:
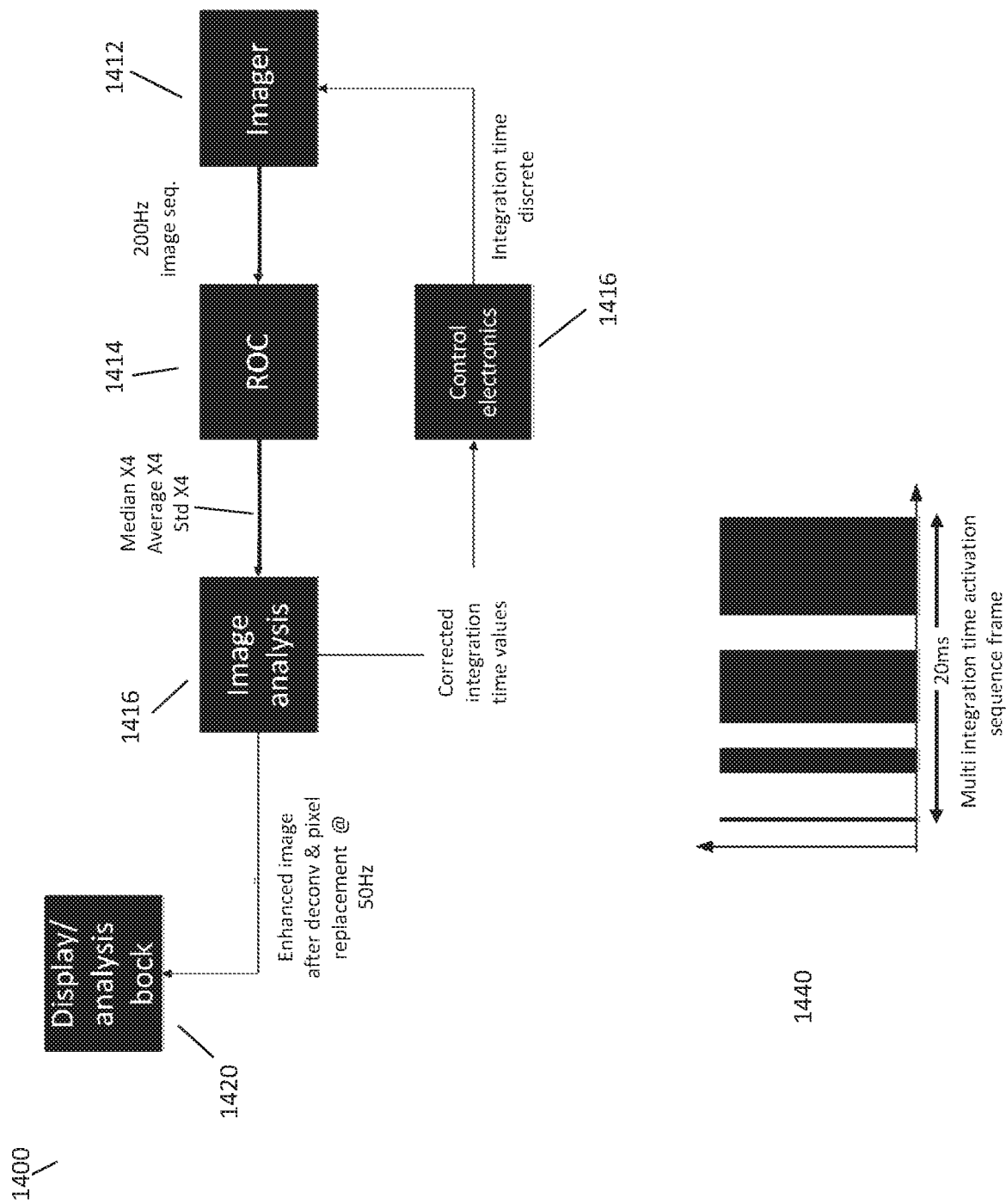
FIG. 24 illustrates a functional multi-integration scheme for ultra-sensitivity imaging sensors in accordance with this disclosure.

Improved ultra-sensitive visible band imager implementations may also provide significant improvements in ROAS operations and performance. However, the use of visible ultra-low light CMOS imagers with their hyper sensitivity, may decrease the operability of such devices when exposed to strong light sources. This can be overcome as depicted in FIG. 24, presenting block diagram of system 1400, which uses a multi-integration scheme, whereby the imager is may run at high frame rates (i.e. 200 Hz or more) and may perform a per-pixel real time or region selection of the preferred integration, based on pixel saturation criteria, or preferably may combine multiple integration samples per pixel in achieving a significantly extended image dynamic range. This may also assist in de-convolving any such illumination interference. System 1400 may comprise imager 1412, radius of curvature (ROC) block 1414, image analysis block 1416, display analysis block 1420, and control/feedback/stabilizer unit 1416.

Figure 25:
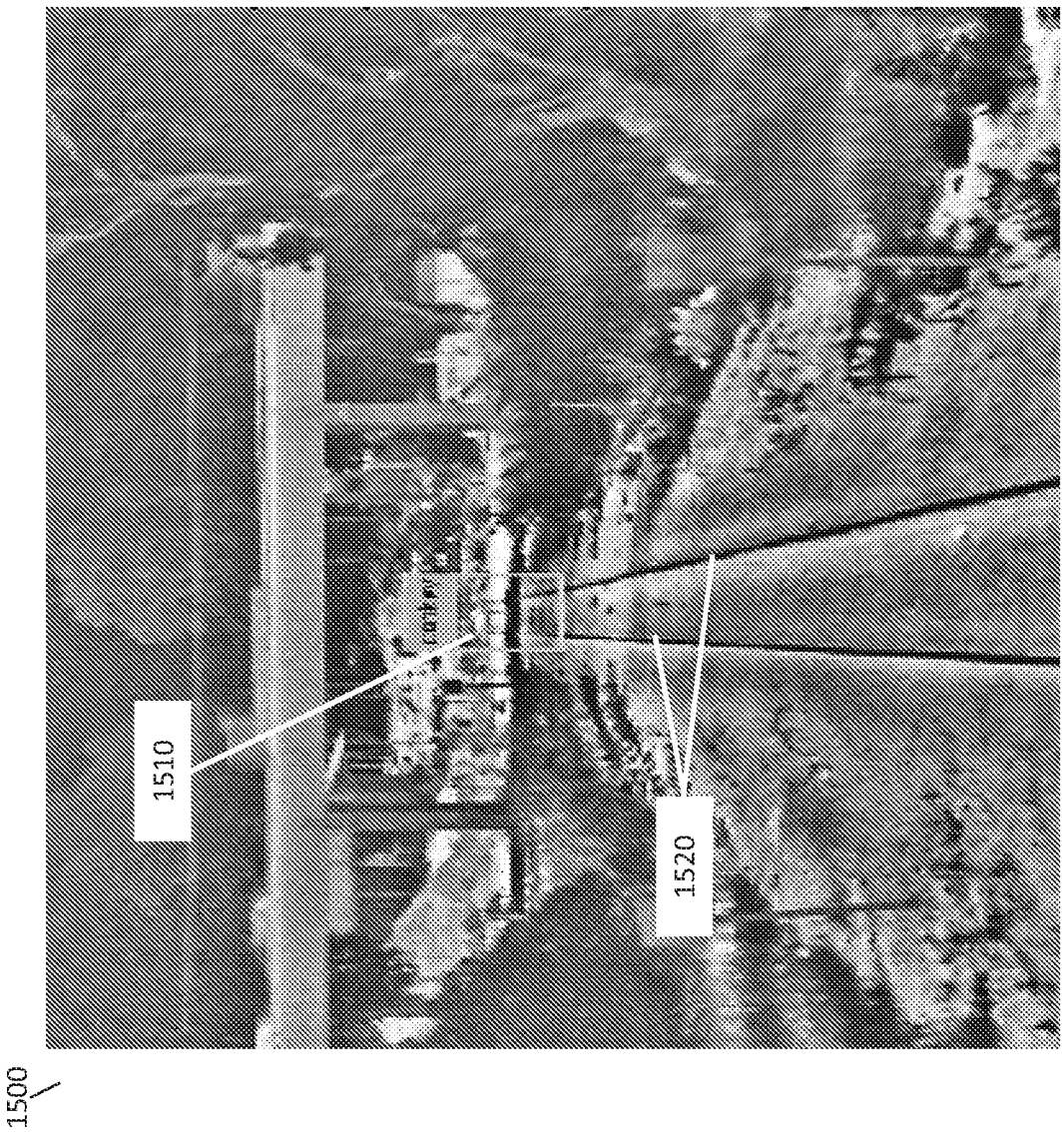
FIG. 25 depicts an exemplary result of a neural net object (donkey) classification solution in accordance with this disclosure.

Reference is made to FIG. 25 which depicts an exemplary result of a neural net object classification solution as described with respect to FIG. 9, unit 234 OONNA. In this example, a donkey 1510 that is standing between the rails 1520 at a level crossing approximately 1000 meters away is detected and correctly classified accordingly.

The invention claimed is:
1. A method for rail obstacle avoidance, comprising:
   performing rail detection and tracking process, comprising:
      spatial rail detection;
      temporal rail tracking;
      image based rail mapping; and
      rail-based ranging, wherein the rail-based ranging comprises calculation of the range along the rails based on known gauge of the rail;
   performing object and obstacle detection, comprising:
      spatial object and obstacle detection; and
      temporal object and obstacle tracking;
   performing object and obstacle classification, comprising:
      object and obstacle silhouette analyzing; and
      object and obstacle classification; and
   providing by a display, user-interface and alarm module (DUAM) display, user interface and alarm signals.
2. The method of claim 1 further comprising, in the rail detection and tracking process stage:
   receiving geo-location information;
   performing 3D modeling of the area close to the rail; and
   performing geo-based rail mapping.
3. The method of claim 2 further comprising:
   performing object and obstacle analysis using neural net computing.
4. The method of claim 3 further comprising:
   providing geo-location and 3D modeling of the area close to the rail to the DUAM.
5. The method of claim 1, further comprising:
   determining a forward range for setting a separation line for separating the field of view of the rails to a first segment associated with a short range imager and a second segment extending beyond the first segment and associated with a long range imager.
6. The method of claim 1 further comprising obtaining images of a rails in front of a traveling vehicle from two or more imagers, wherein at least one of the two or more imagers is adapted to obtain images in a range of wavelengths different form that of at least one other imager.
7. The method of claim 1 further comprising obtaining images of a rails in front of a traveling vehicle from two or more imagers, wherein at least one of the two or more imagers is adapted to have field of view narrower than that of at least one other imager.
8. A system for rail obstacle detection and avoidance, comprising:
   at least two imagers aimed to the direction of travel along the rail;
   a controller to receive plurality of images from the at least two imagers, to process the images, to identify and detect rail in the images, to identify and detect objects posing threat thus being potential obstacle in the vicinity of the rail and to provide alarm signal when threatening object is detected;

a driver monitor to present to a train driver images received from the at least two imagers and to present processed rail and objects detected in the images; and alarming unit to provide alarms when obstacle is detected;

wherein the at least two imagers are of different sensing range from each other; and wherein at least one of the at least two imagers is provided with non-linear bolometric type imaging unit.

9. The system of claim 8, further comprising storage unit to store images received from the at least two imagers, to store processed images, to store programs that when executed by the controller perform obstacle detection and avoidance.

10. The system of claim 8, wherein at least one of at least two imagers is operative in a wavelength range different from art least one other imager from the at least two imagers.

11. The system of claim 8 further comprising ambient and location sensing unit adapted to sense weather near the rail and to provide location indication for a train traveling on the rail.

12. The system of claim 8 further comprising communication unit to enable communication of alarm signals and of location of the system to external units.

13. The system of claim 11, wherein detection and identification of obstacles comprises processing of images from the at least two imagers based on location-based mapping of the rails and its close ambient.

14. The system of claim 8, wherein the controller is adapted to perform neural net analysis of the images from the at least two imagers.

* * * * *